(12) United States Patent
Chen et al.

(10) Patent No.: US 8,972,450 B2
(45) Date of Patent: Mar. 3, 2015

(54) MULTI-STAGE PARALLEL MULTI-CHARACTER STRING MATCHING DEVICE

(71) Applicant: National Taiwan University, Taipei (TW)

(72) Inventors: Chien-Chi Chen, Taipei (TW); Sheng-De Wang, Taipei (TW)

(73) Assignee: National Taiwan University, Taipei (JP)

( * ) Notice: Subject to any disclaimer, the term of this patent is extended or adjusted under 35 U.S.C. 154(b) by 210 days.

(21) Appl. No.: 13/864,500

(22) Filed: Apr. 17, 2013

(65) Prior Publication Data

US 2014/0317134 A1    Oct. 23, 2014

(51) Int. Cl.
   *G06F 17/30*    (2006.01)

(52) U.S. Cl.
   CPC .............................. *G06F 17/30985* (2013.01)
   USPC .......................................... 707/791; 707/802

(58) Field of Classification Search
   CPC ..................... G06F 17/30002; G06F 17/30286
   USPC .......................................... 707/791, 802, 803
   See application file for complete search history.

(56) References Cited

U.S. PATENT DOCUMENTS 6,240,213 B1 *   5/2001   Cho .............................. 382/245
7,725,510 B2 *   5/2010   Alicherry et al. ............... 706/48

OTHER PUBLICATIONS

Seongyong Ahn et al., "A hardware-efficient multi-character string matching architecture using brute-force algorithm", Nov. 22-24, 2009, SoC Design Conference (ISOCC), IEEE, pp. 464-467.*

* cited by examiner

*Primary Examiner* — Cheryl Lewis
(74) *Attorney, Agent, or Firm* — Ming Chow; Sinorica, LLC

(57) ABSTRACT

A multi-stage parallel multi-character string matching device, including: a rule circuit having multiple rule units, each of the multiple rule units embodying a transition rule based on an AC-trie; a state circuit coupled with the rule circuit for determining multiple next-state data; and an output circuit coupled with the rule circuit for determining multiple matching output data.

7 Claims, 20 Drawing Sheets

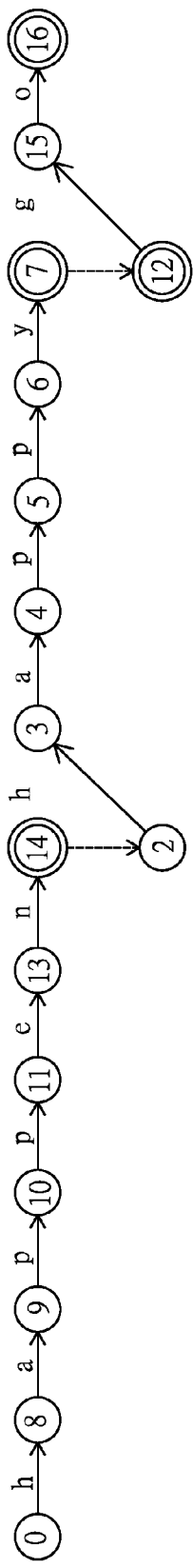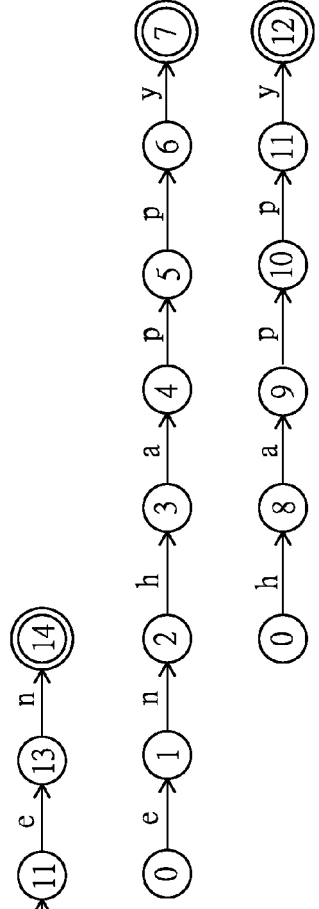
(PRIOR ART)
FIG. 2(a)
(PRIOR ART)
FIG. 2(b)

| no. | Stage | PMASIK | P_ST | P_CHRS | OMASK | NX_ST | OP1 | OP2 | OP3 |
|---|---|---|---|---|---|---|---|---|---|
| 1 | 7 | 1111 | 4 | ppy | 1111 | 7 | | | 7 |
| 2 | 7 | 1111 | 4 | ppe | 1111 | 13 | | | |
| 3 | 7 | 1111 | 11 | ygo | 1111 | 16 | 12 | | 16 |
| 4 | 7 | 1100 | 11 | y?? | 0100 | - | 12 | | |
| 5 | 7 | 1110 | 11 | en? | 0110 | - | | 14 | |
| 6 | 7 | 1111 | 5 | pyg | 1111 | 15 | | 7 | |
| 7 | 7 | 1110 | 5 | py? | 0110 | - | | 7 | |
| 8 | 7 | 1111 | 5 | pen | 1111 | 14 | | | 14 |
| 9 | 7 | 1110 | 12 | go? | 0110 | - | | 16 | |
| 10 | 7 | 1100 | 13 | n?? | 0100 | - | 14 | | |
| 11 | 7 | 1111 | 6 | ygo | 1111 | 16 | 7 | | 16 |
| 12 | 7 | 1100 | 6 | y?? | 0100 | - | 7 | | |
| 13 | 7 | 1110 | 6 | en? | 0110 | - | | 14 | |
| 14 | 7 | 1100 | 15 | o?? | 0100 | - | 16 | | |
| 15 | 7 | 1110 | 7 | go? | 0110 | - | | 16 | |
| 16 | 6 | 1111 | 3 | app | 1111 | 6 | | | |
| 17 | 6 | 1111 | 10 | pyg | 1111 | 15 | | 12 | |
| 18 | 6 | 1110 | 10 | py? | 0110 | - | | 12 | |
| 19 | 6 | 1111 | 10 | pen | 1111 | 14 | | | 14 |

FIG. 6(a)

| no. | Stage | PMASIK | P_ST | P_CHRS | OMASK | NX_ST | OP1 | OP2 | OP3 |
|---|---|---|---|---|---|---|---|---|---|
| 20 | 5 | 1111 | 2 | hap | 1111 | 5 | | | |
| 21 | 5 | 1111 | 9 | ppy | 1111 | 12 | | | 12 |
| 22 | 5 | 1111 | 9 | ppe | 1111 | 13 | | | |
| 23 | 4 | 1111 | 1 | nha | 1111 | 4 | | | |
| 24 | 4 | 1111 | 8 | app | 1111 | 11 | | | |
| 25 | 3 | 0111 | 0 | enh | 1111 | 3 | | | |
| 26 | 3 | 0111 | 0 | hap | 1111 | 10 | | | |
| 27 | 2 | 0011 | 0 | ?en | 1011 | 2 | | | |
| 28 | 2 | 0011 | 0 | ?ha | 1011 | 9 | | | |
| 29 | 1 | 0001 | 0 | ??e | 1001 | 1 | | | |
| 30 | 1 | 0001 | 0 | ??h | 1001 | 8 | | | |

FIG. 6(b)

Matching cycle 1    IN_CHRS:enh

| Stage | CUR_ST | Rule no | PMASK | P_ST | P_CHRS | OMASK | NX_ST | OP1 | OP2 | OP3 |
|---|---|---|---|---|---|---|---|---|---|---|
| 1 | 0 | 30 | 0001 | 0 | ??h | 1001 | 8 | | | |
| | | Next stste and matching outputs | | | | | 8 | | | |
| 3 | 0 | 25 | 0111 | 0 | enh | 1111 | 3 | | | |
| | | Next state and matching outputs | | | | | 3 | | | |
| Matching outputs | | | | | | | | | | |

Matching cycle 2    IN_CHRS:app

| Stage | CUR_ST | Rule no | PMASK | P_ST | P_CHRS | OMASK | NX_ST | OP1 | OP2 | OP3 |
|---|---|---|---|---|---|---|---|---|---|---|
| 4 | 8 | 24 | 1111 | 8 | app | 1111 | 11 | | | |
| | | Next stste and matching outputs | | | | | 11 | | | |
| 6 | 3 | 16 | 1111 | 3 | app | 1111 | 6 | | | |
| | | Next state and matching outputs | | | | | 6 | | | |
| Next atate to stage 7 | | | | | | | 6 | | | |
| Matching outputs | | | | | | | | | | |

Matching cycle 3    IN_CHRS:enh

| Stage | CUR_ST | Rule no | PMASK | P_ST | P_CHRS | OMASK | NX_ST | OP1 | OP2 | OP3 |
|---|---|---|---|---|---|---|---|---|---|---|
| 7 | 6 | 13 | 1110 | 6 | en? | 0110 | - | | 14 | |
| | | Next stste and matching outputs | | | | | - | | 14 | |
| 1 | 0 | 30 | 0001 | 0 | ??h | 1001 | 8 | | | |
| | | Next state and matching outputs | | | | | 8 | | | |
| 3 | 0 | 25 | 0111 | 0 | enh | 1111 | 3 | | | |
| | | Next state and matching outputs | | | | | 3 | | | |
| Matching outputs | | | | | | | | | 14 | |

FIG. 7(a)

Matching cycle 4　　　　　　　IN_CHRS:app

| Stage | CUR_ST | Rule no | PMASK | P_ST | P_CHRS | OMASK | NX_ST | OP1 | OP2 | OP3 |
|---|---|---|---|---|---|---|---|---|---|---|
| 4 | 8 | 24 | 1111 | 8 | app | 1111 | 11 | | | |
| | | Next stste and matching outputs | | | | | 11 | | | |
| 6 | 3 | 16 | 1111 | 3 | app | 1111 | 6 | | | |
| | | Next state and matching outputs | | | | | 6 | | | |
| Next atate to stage 7 | | | | | | | 6 | | | |
| Matching outputs | | | | | | | | | | |

Matching cycle 5　　　　　　　IN_CHRS:ygo

| Stage | CUR_ST | Rule no | PMASK | P_ST | P_CHRS | OMASK | NX_ST | OP1 | OP2 | OP3 |
|---|---|---|---|---|---|---|---|---|---|---|
| 7 | 6 | 11 | 1110 | 6 | ygo | 0110 | 16 | 7 | | 16 |
| | | 12 | 1100 | 6 | y?? | 0100 | - | 7 | | |
| | | Next state and matching outputs | | | | | 16 | | | |
| Matching outputs | | | | | | | | 7 | | 16 |

FIG. 7(b)

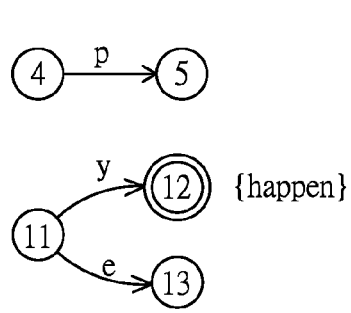
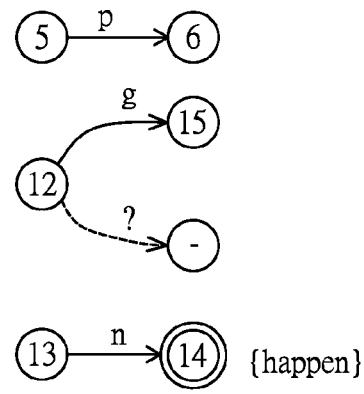
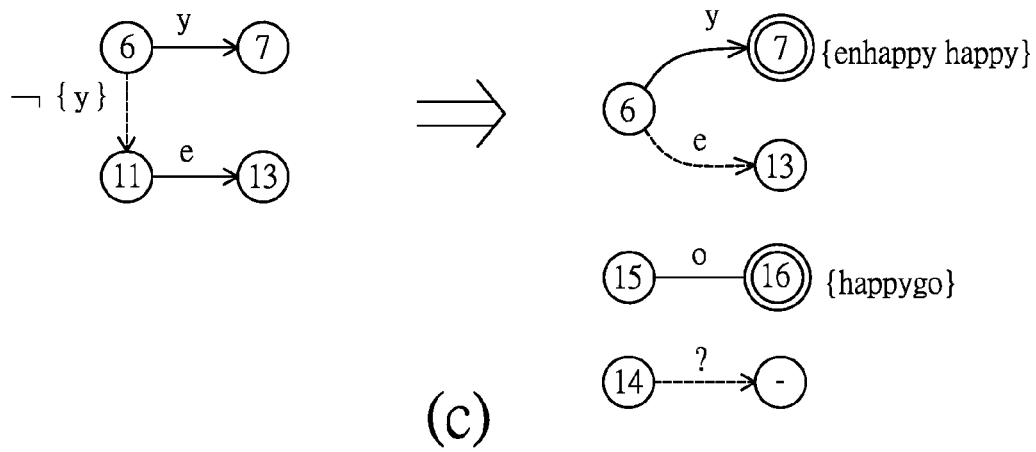
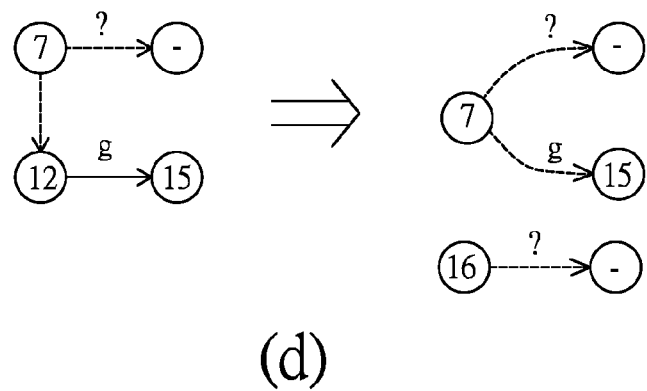
FIG. 11

Algorithm for constructing k-character transition set
Input.
    k: number of characters
    NXSET: 1-character transition set
Output.
    TRSET: k-character transition set
Method.
1. begin
2.   TRSET ← empty
3.   for each state Si do
4.   begin
5.      NSET ← all 1-char transitions from state Si
6.      repeat k-1 do
7.      begin
8.         TMPSET ← empty
9.         for each transition NXi of NSET do
10.        begin
11.           NX_ST ← next state of transition NXi
12.           for each transition NXj from NX_ST do
13.           begin
14.              NEW_TR ← concatenate NXi with NXj
15.              TMPSET ← TMPSET U NEW_TR
16.           end
17.        end
18.        NSET ← TMPSET
19.      end
20.      TRSET ← TRSET U NSET
21.   end
22.   remove unused transitions from TRSET
23.   return TRSET
24. end

FIG. 14

MULTI-STAGE PARALLEL MULTI-CHARACTER STRING MATCHING DEVICE

BACKGROUND OF THE INVENTION

1. Field of the Invention

The present invention relates to a string matching device, especially to a multi-stage parallel multi-character string matching device.

2. Description of the Related Art

A string matching algorithm proposed by Alfred V. Aho and Margaret J. Corasick—generally called AC algorithm—is an effective method of exact string matching, which is capable of locating all keywords in a string by a one-pass search. One of important applications of the AC algorithm is in network intrusion detection systems (NIDS), of which SNORT, for example, is a well-known one.

A search tree based on the AC algorithm is called AC-trie. Please refer to FIG. 1, which illustrates an AC-trie constructed according to a keyword set {enhappy, happy, happen, happygo}. In FIG. 1, circles having a number inside represent states; states of double circles represent output states—ie., when a state transition goes to a state of double circles (state 7, for example), it means there is a matching string ("enhappy happy"); solid lines represent goto functions and dash lines represent failure functions and the functions of the goto functions and failure functions will be explained below. In fact, each state except an initial state has a failure function to link to the initial state or another state. To keep the figure easy to read, the failure functions (of state 1, for example) linking to the initial state are not depicted in FIG. 1. When the failure function of a state links to another state but not to the initial state, it means a string represented by the preceding state contains a string represented by the subsequent state. For example, the failure function of state 7 links to state 12, and a string represented by state 7 contains a string represented by state 12 (the string represented by state 7 is "enhappy", and the string represented by state 12 is "happy").

When the AC-trie of FIG. 1 is used to perform a string matching, the initial state 0 is first set as current state, and an input string is processed with one character at a time. For each character of the input string, the goto functions of the current state is to be evaluated to locate a matched one to determine next state; if none of the goto functions is matched, then the state pointed by the failure function is assigned as current state to proceed with the string matching. Via the failure functions, every state can reach the initial state eventually. As the goto functions of the initial state cover all characters, next state can be surely determined via the goto functions and the failure function in processing each character. A matching cycle starts from receiving an input character and ends at next state is determined via the goto functions and the failure function. After having matched a character and determined a next state, the next state is assigned as current state to receive a next character to enter a next matching cycle. Based on the foregoing specification of matching process, it is known that by forming an AC-trie and the goto functions and failure function to perform a string matching, it only takes a one-pass search to locate all the occurrences of the matched key words, and a search time thereof is a linear function of a string length of the input string, i.e., O(n).

Please refer to FIG. 2(a), which illustrates a scenario of using the AC-trie of FIG. 1 to perform a string matching process. As illustrated in FIG. 2(a), when the string matching process reaching state 14 (7), the current state will transfer to state 2 (12) according to the failure function to proceed with the matching process. FIG. 2(b) illustrates a corresponding NFA (non-deterministic finite automata) string matching process of FIG. 2(a), which allows multiple states to be active simultaneously, wherein, state 0 is always active, i.e., as long as state 0 detects an input character matching key character e or h, the NFA will start a string matching process. In FIG. 2(b), first string matching process for matching "happen" and second string matching process for matching "enhappy" will proceed simultaneously when matching "en"; the second string matching process and third string matching process for matching "happygo" will proceed simultaneously when matching "happy".

As can be seen from the foregoing specification, AC-trie has a form similar to DFA (deterministic finite automata), because only one state is active at a time. In the NFA string matching, however, it can be seen that in each matching cycle, states linked with a failure function will be active simultaneously. As all the states link to the initial state through failure functions, the initial state is therefore always active. As a result, AC-trie can take advantage of the failure functions to attain an effect similar to that of NFA. AC-trie in DFA form can only maintain one state active, which is advantageous for software construction because codes in a program are executed sequentially; however, due to a fact that there can be more than once of states transfer in processing a character, AC-trie in DFA form is disadvantageous for hardware construction.

If multiple states of an AC-trie are allowed to be active simultaneously, then it will operate in a manner of NFA without any failure function, which is advantageous for hardware construction. Besides, as each state of an AC-trie represents a unique string, a distance between a state and the initial state is defined as a depth of the state. At any given time, only one of states of a same depth is active, because the states of a same depth represent different strings of a same length. If there are more than one state of a same depth active simultaneously, then it will contradict with the definition of AC-trie and therefore won't happen. If states of a same depth are attributed to a same level, then, when the NFA is implemented by hardware, each level only requires a register for keeping states. For example, if the longest string in a set of keywords has a length of q, then at most q registers are needed to keep states of each level.

As mentioned above, AC-trie is suitable for processing data in character-oriented manner. That is, when AC-trie is used in a string matching, only one character but not multiple characters can be inspected at a time, and prior art hardware structures based on the AC-trie can only process a character per clock cycle, so that the highest number of characters processed per unit time is limited by a clock frequency of hardware.

Besides, as semiconductor technology continues to make progress, it is easy to design and develop hardware structures according to practical needs, and more circuits can be implemented in a same area. However, it is difficult to increase the operation speed of circuits, and circuits operating in high speeds tend to consume more power. Taking a general CPU for example, to solve the problems, multiple cores can be implemented in a chip to promote performance by providing a parallel operation. The same thing, if a hardware device for string matching can inspect multiple characters in a matching cycle, its performance will be greatly enhanced.

SUMMARY OF THE INVENTION

One objective of the present invention is to propose a multi-stage parallel multi-character string matching device, which is capable of matching multiple characters in a matching cycle to fully exploit a performance of a hardware device.

Another objective of the present invention is to propose a multi-stage parallel multi-character string matching device, which uses multiple pattern data each corresponding to a sequential matching path of an AC-trie to attain a parallel multi-character string matching.

Another objective of the present invention is to propose a multi-stage parallel multi-character string matching device, which is capable of inspecting multiple characters in a matching cycle to greatly promote string matching performance.

Another objective of the present invention is to propose a multi-stage parallel multi-character string matching device, which is capable of using an AC-trie to create multi-character transition rules.

To attain the foregoing objectives, a multi-stage parallel multi-character string matching device is proposed, the multi-stage parallel multi-character string matching device including:

a rule circuit having M general rule units, of which each has a string input end, N current state input ends, L next state output ends, and K matching output ends, wherein, M, N, L, K are positive integers, L is larger than K, and N=L−K; and of which each has transition rule based on an AC-trie;

a state circuit, which has L first priority multiplexers and a second priority multiplexer, each of the first priority multiplexers having M first input ends and a first output end, the second priority multiplexer having K+1 second input ends and a second output end, wherein an Ith one of the first priority multiplexers has a Jth one of the first input ends coupled to an Ith one of the next state output ends of a Jth one of the rule units, J=1 to M, I=1 to L, I, J being positive integers, wherein, the first output ends of first to (L−K−1)th ones of the first priority multiplexers are coupled to first to (L−K−1)th ones of the current state input ends of the rule circuit respectively; a Pth one of the second input ends of the second priority multiplexer is coupled to the first output end of an (L−P+1)th one of the first priority multiplexers, P=1 to K+1, P being a positive integer, and the second output end of the second priority multiplexer is coupled to an (L−K)th one of the current state input ends of the rule circuit; and an output circuit, which has K third priority multiplexers each having M third input ends and a third output end, wherein Rth one of the third input ends of Qth one of the third priority multiplexers is coupled with Qth one of the matching output ends of Rth one of the rule units, R=1 to M, and the third output end of Qth one of the third priority multiplexers being used to provide a Qth matching output data, Q=1 to K, and Q, R being positive integers.

In one embodiment, the general rule unit includes:

a multiplexer, which has a first selection input end, L data input ends, and a data output end, wherein, first to Kth ones of the data input ends are coupled with a low voltage, and (K+1)th to Lth ones of the data input ends are coupled with first to (L−K)th ones of the current state input ends;

a rule unit embodying one of the transition rules, the rule matching unit including: a fourth input end coupled with the string input end; a fifth input end coupled with the data output end of the multiplexer; a stage data output end coupled with the first selection input end of the multiplexer; a next state data output end; and K fourth output ends coupled with the K matching output ends respectively; and a de-multiplexer having: a second selection input end coupled with the stage data output end of the rule unit; a sixth input end coupled with the next state data output end of the rule unit; and L fifth output ends coupled with the L next state output ends respectively.

To attain the foregoing objectives, another multi-stage parallel multi-character string matching device is proposed, the multi-stage parallel multi-character string matching device including:

a first priority multiplexer having K+1 next state data input ends and a next state data output end, K being a positive integer;

L stage units, L being a positive integers, each of the stage units having a current state input end, a string input end, a next state output end, and K stage matching output ends, the string input end being used for receiving a string of K input characters, and each of the stage units having multiple transition rules based on an AC-trie, wherein, first to (L−1)th ones of the stage units are divided into K series combinations, the current state input end of a first one of the stage units of each of the series combinations is coupled with a low voltage, each of the current state input end of second to last ones of the stage units of each of the series combinations is coupled with the next state output end of a preceding one of the stage units, and the next state output end of a last one of the stage units of Ith one of the series combinations is coupled to (K−I+2)th one of the next state data input ends of the first priority multiplexer, I being a positive integer, and I=1 to K; the current state input end of Lth one of the stage units is coupled with the next state data output end of the first priority multiplexer, and the next state output end of the Lth one of the stage units is coupled to a first one of the next state data input ends of the first priority multiplexer; and K second priority multiplexers corresponding to K input characters, each of the second priority multiplexers having L stage matching input ends and a matching data output end, wherein first to Lth ones of the stage matching input ends of Jth one of the second priority multiplexers are coupled with Jth one of the stage matching output ends of Lth to first ones of the stage units respectively, and the matching data output end of the Jth one of the second priority multiplexers is used to provide Jth output data, wherein J is a positive integer and J=1 to K.

In one embodiment, each of the stage units includes:

M rule units each embodying one of the transition rules and each having a first input end, a second input end, a first output end, and K second output ends, wherein the first input end is coupled with the current state input end, the second input end is coupled with the string input end, the first output end is used for providing a next state candidate data, and the second output end is used for outputting a matching candidate data;

a third priority multiplexer having M third input ends and a third output end, wherein first to Mth ones of the third input ends are coupled with the first output ends of first to Mth ones of the rule units respectively;

a state register having a latch input end and a latch output end, wherein the latch input end is coupled with the third output end, and the latch output end is coupled with the next state output end; and K fourth priority multiplexers each having M fourth input ends and a fourth output end, wherein first to Mth ones of the fourth input ends of Pth one of the fourth priority multiplexers are coupled with Pth one of the second output ends of first to Mth ones of the rule units respectively, and the fourth output end is coupled with Pth one of the stage matching output ends, wherein P is a positive integer and P=1 to K.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 2(a) illustrates a scenario of using the AC-trie of FIG. 1 to perform a string matching process.

FIG. 2(b) illustrates a corresponding NFA (non-deterministic finite automata) string matching process of FIG. 2(a).

FIGS. 6(a) and 6(b) illustrate a rule table used for the string matching of the present invention.

FIGS. 7(a) and 7(b) illustrate a matching example according to the design of the present invention.

FIG. 10-11 illustrate an embodiment of 1-character transition functions of the present invention.

FIG. 14 illustrates an embodiment of an algorithm of the present invention.

DETAILED DESCRIPTION OF THE PREFERRED EMBODIMENTS

The present invention will be described in more detail hereinafter with reference to the accompanying drawings that show the preferred embodiments of the invention. In the specification below, a hardware structure of the present invention will be specified first, a multi-character transition rule utilized in the hardware structure next, and finally an algorithm for generating a multi-character transition rule based on an AC-trie.

Specification of a Hardware Structure

First, to specify a string matching device of the present invention, each state of an AC-trie is attributed to a level according to its depth—for example: initial state is attributed to level 0, state 1 and 8 both having a depth of 1 are attributed to level 1, etc.

Figure 3:
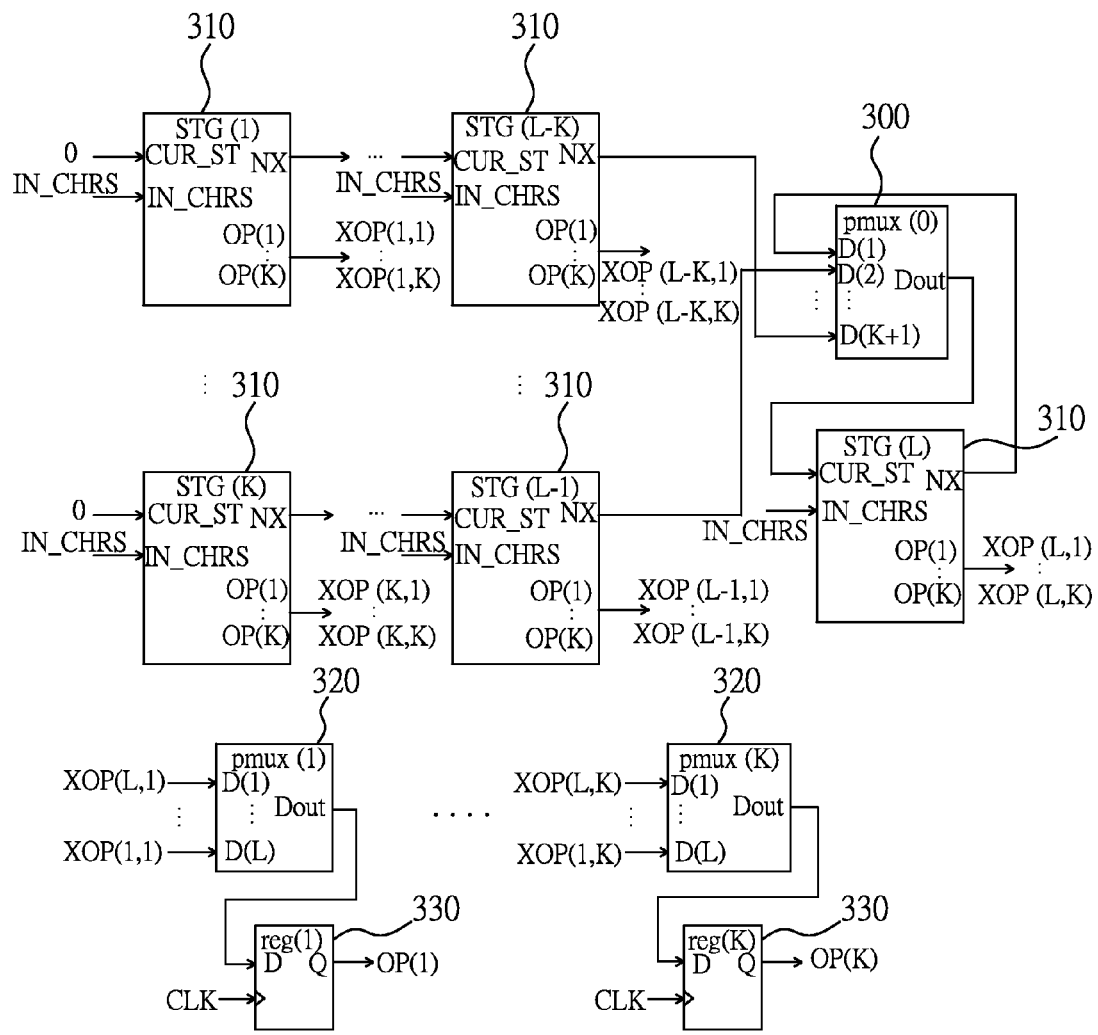
FIG. 3 illustrates a block diagram of a multi-stage parallel multi-character string matching device according to an embodiment of the present invention.

FIG. 3 illustrates a block diagram of a multi-stage parallel multi-character string matching device according to an embodiment of the present invention. As illustrated in FIG. 3, the device has a first priority multiplexer 300, L stage units 310, K second priority multiplexers 320, and K registers 330, wherein L, K are positive integers.

The first priority multiplexer 300 has K+1 next state data input ends D(1)–D(K+1) and a next state data output end Dout.

Each of the L stage units 310 has a current state input end CUR_ST, a string input end IN_CHRS, a next state output end NX, and K stage matching output ends OP(1)–OP(K). The string input end IN_CHRS is used for receiving a string of K input characters, and each of the stage units 310 has multiple transition rules based on an AC-trie, wherein, first to (L−1)th ones of the stage units 310 are divided into K pipelines, the current state input end CUR_ST of first one of the stage units 310 of each of the pipelines is coupled with a low voltage, each of the current state input end CUR_ST of second to last ones of the stage units 310 of each of the pipelines is coupled with the next state output end NX of a preceding one of the stage units 310, and the next state output end NX of a last one of the stage units 310 of Ith one of the pipelines is coupled to (K−I+2)th one of the next state data input ends of the first priority multiplexer 300, I being a positive integer, and I=1 to K; the current state input end CUR_ST of Lth one of the stage units 310 is coupled with the next state data output end Dout of the first priority multiplexer 300, and the next state output end NX of the Lth one of the stage units 310 is coupled to a first one—D(1)—of the next state data input ends of the first priority multiplexer 300.

K second priority multiplexers 320 corresponding to K input characters, each of the second priority multiplexers 320 having L stage matching input ends D(1)–D(L) and a matching data output end Dout, wherein first to Lth ones of the stage matching input ends D(1)–D(L) of Jth one of the second priority multiplexers 320 are coupled with OP(J)—Jth one of the stage matching output ends—of Lth to first ones of the stage units 310 respectively, and the matching data output end Dout of the Jth one of the second priority multiplexers 320 is used to provide Jth output data, wherein J is a positive integer and J=1 to K.

K registers 330 are used to store output data of K second priority multiplexers 320.

The more the number of the characters processed in parallel in a matching cycle is, the higher the throughput will be, although the number of transition rules will also increase and the hardware cost will thereby get higher. After completing a matching cycle, K registers 330 deliver K matching outputs with each corresponding to an input character. Therefore, the string matching device can inspect K characters in parallel at a time. As the string matching device operates according to a clock signal CLK, a matching cycle is defined as one cycle of CLK.

In FIG. 3, K matching outputs of ith one of the stage units 310 are indicated as XOP(i, 1)–XOP(i, K), wherein the first L−1 stage units 310 are divided into K pipelines, which operate in a way of NFA. The last, i.e. Lth one of the stage units 310, operates in a way of DFA. Based on this arrangement, no matter how long the longest string of a keyword set is, the number of the stage units 310 can stay unchanged. In comparison with a structure of pure pipeline, this arrangement will have a little more transfer functions, but in the structure of pure pipeline, the number of the stage units will vary with the length of the longest string of the keyword set. Besides, the number of the transition functions is varied by the number of the stage units—the more the number of the stage units is, the less the number of the transition functions will be.

In the first L−1 ones of the stage units 310, every K ones of the stage units 310 correspond to a level of the AC-trie—first to Kth ones of the stage units 310 correspond to level 0 of the AC-trie, i.e., the initial state 0; (K+1)th to (L−1)th ones of the stage units 310 correspond to level 1 to level L−K−1 of the AC-trie. The Lth one of the stage units 310 corresponds to levels higher than or equal to L−K. The first to (K−1)th ones of the stage units 310 are used to handle a situation where an input string is not in alignment with a pattern, that is, a situation where a first character of the pattern is not to be found at a starting character of the input string.

In each pipeline, the next state determined by the last one of the stage units 310 and the next state determined by Lth one of the stage units 310 are sent to the first priority multiplexer 300 to determine a state value for the Lth one of the stage units 310. The next state determined by a subsequent one of the stage units 310 has a higher priority than that of the next state determined by a preceding one of the stage units 310, and the next state delivered by the Lth one of the stage units 310 has the highest priority. The Lth one of the stage units 310 can be viewed as a terminal stage unit, because each pipeline eventually delivers a next state to the Lth one of the stage units 310, and the Lth one of the stage units 310 will execute a recursive operation accordingly.

K second priority multiplexers 320 are used to determine matching outputs OP(1)–OP(K) each for an input character. For example, pmux(1)—first one of the second priority multiplexers 320—determines first one of the matching outputs for the first input character, and pmux(K)—Kth one of the second priority multiplexers 320—determines Kth one of the matching outputs for the Kth input character. Besides, the matching output determined by a subsequent one of the stage units 310 has a higher priority than the matching output determined by a preceding one of the stage units 310, because a longer matching output string will cover a shorter matching output string. Taking the AC-trie of FIG. 1 for example, the matching output "enhappy" of state 7 of level 7 covers the matching output "happy" of state 12 of level 5.

Each of the second priority multiplexers 320 has L input ends D(1)–D(L), and an output end Dout, wherein each of the input ends includes a control signal (not illustrated in the figure) for indicating whether a corresponding input signal is valid. Of the input ends, D(1) has the highest priority, and D(L) has the lowest priority. For example, when input data of D(1) is valid, the input data of D(1) will be selected to pass through Dout, irrespective of whether any data of D(2)–D(L) is valid; or, when both data of D(2) and D(3) are valid, data of D(2) will be selected to pass through Dout due to a higher priority.

As the matching output of a subsequent one of the stage units 310 has a higher priority than the matching output of a preceding one of the stage units 310, therefore, the matching outputs of last ones of the stage units 310 are coupled to the input ends of first ones of the second priority multiplexer 320, and the matching outputs of first ones of the stage units 310 are coupled to the input ends of last ones of the second priority multiplexer 320. For example, the matching output of Lth one of the stage units 310 is coupled to the input end D(1) of the second priority multiplexer 320, and the matching output of first one of the stage units 310 is coupled to the input end D(L) of the second priority multiplexer 320. Through the foregoing specification, it would be easy for a person having ordinary skill in the art to realize the functions of the first priority multiplexer 300 and the second priority multiplexer 320 with a variety of structures.

Besides, K registers 330 are used to latch the matching outputs in response to the clock signal CLK. K registers 330 output OP(1)–OP(K) each corresponding to a matching string of an individual character of an input string received via IN_CHRS. To the convenience of programming a storage space, each of the outputs OP(1)–OP(K) can be a code representing a matching string—a state number of an output state of the AC-trie, the output state corresponding to a matching string, for example.

Figure 4:
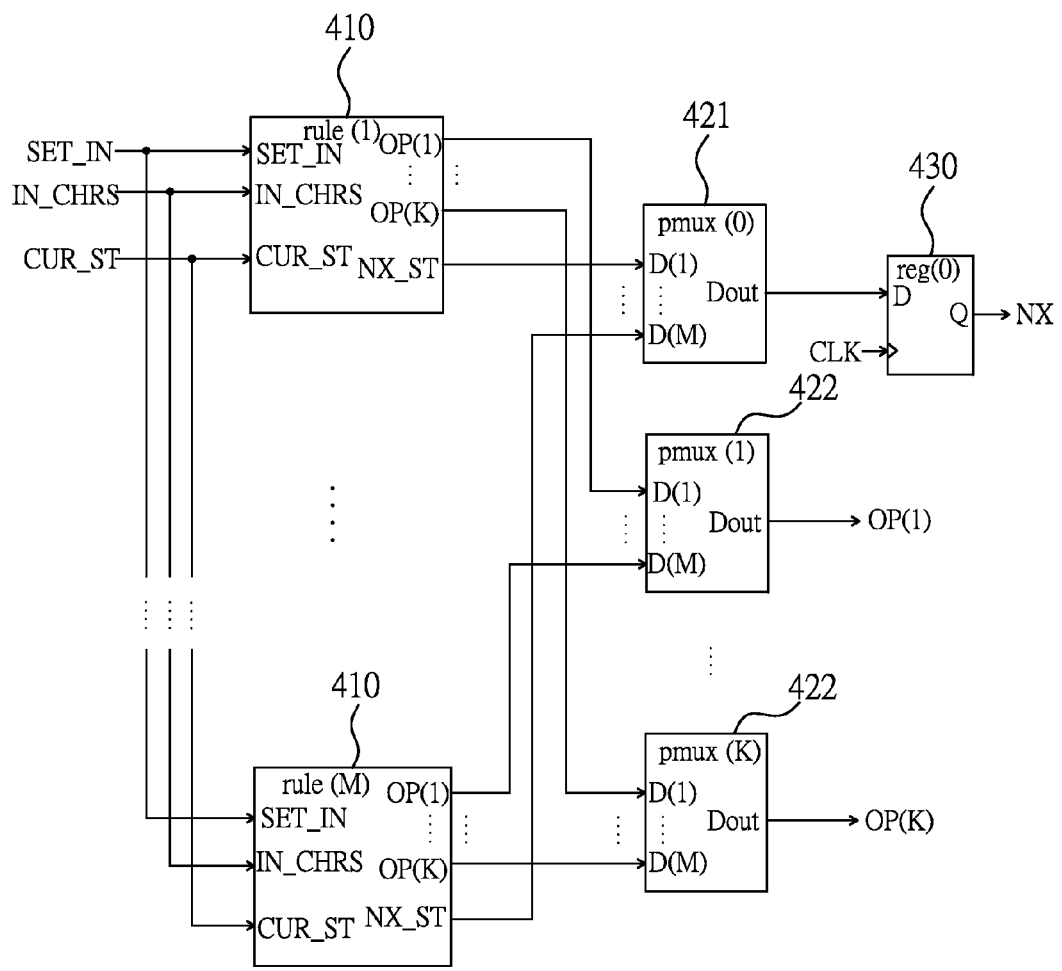
FIG. 4 illustrates a block diagram of a stage unit of FIG. 3 according to an embodiment of the present invention.

FIG. 4 illustrates a block diagram of the stage unit 310 according to an embodiment of the present invention. As illustrated in FIG. 4, the stage unit 310 has M rule units 410, a third priority multiplexer 421, K fourth priority multiplexers 422, and a state register 430. The stage unit 310 receives K input characters via IN_CHRS and current state via CUR_ST, so as to perform a matching operation in the M rule units 410, and determine next state NX and K matching outputs OP(1)–OP(K) according to matching results of the rule units 410.

Each of the M rule units 410 embodies one of the transition rules, and has a first input end, a second input end, a first output end (NX_ST), and K second output ends (OP(1)–OP(K)), wherein the first input end is coupled with the current state input end CUR_ST, the second input end is coupled with the string input end IN_CHRS, the first output end is used to output next state candidate data, and the second output end is used to output a matching candidate data.

As each of the rule units 410 corresponds to a transition rule, therefore, the number of the rule units 410 is determined according to the number of transition rules in a stage. Each of the rule units 410 stores information of a transition rule, which will be specified later. Each of the rule units 410 will perform a matching operation on input characters (received via IN_CHRS) and current state (received via CUR_ST) with the transition rule. When the result of the matching operation is positive, a corresponding next state will be output via NX_ST, and K matching outputs will be output via OP(1)–OP(K). In a practical example, state numbers are to be stored to represent output strings. For example, as state 7 corresponds to an output string "enhappy happy", number 7 is stored to represent the output string. As a result, a memory space of a fixed length can be used to store data for the output strings of varying lengths, and it is good for memory hardware configuration. Besides, each of the rule units 410 has a set input end SET_IN for setting a content of the transition rule. Through the foregoing specification, it would be easy for a person having ordinary skill in the art to realize the rule unit 410 with a logic circuit.

Next states and matching outputs determined by M rule units 410 will be processed by the third priority multiplexer 421 and K fourth priority multiplexers 422 to determine next state NX and matching outputs OP(1)–OP(K) for the stage unit 310. In the stage unit 310, the transition rules are allocated according to priority—those of higher priority are assigned with lower numbers. For example, the rule unit 410 of number one has the highest priority, and the rule unit 410 of number M has the lowest priority. Specification of how to determine the priorities of the transition rules will be addressed later.

The third priority multiplexer 421 has M third input ends and a third output end, wherein first to Mth ones of the third input ends are coupled with the first output end of first to Mth ones of the rule units 410. The third priority multiplexer 421 is used to determine a next state, which will be latched in the state register 430 in response to the clock signal CLK.

The state register 430 has a latch input end and a latch output end, wherein the latch input end is coupled with the third output end, and the latch output end is coupled with the next state output end NX. Each of the fourth priority multiplexers 422 has first to Mth ones of the fourth input ends and a fourth output end, wherein first to Mth ones of the fourth input ends of Pth one of the fourth priority multiplexers 422 are coupled with Pth one of the second output ends of first to Mth ones of the rule units 410, and the fourth output end is used to couple with Pth one of the stage matching output ends, wherein P is a positive integer and P=1 to K, to determine the matching outputs OP(1)–OP(K) for each input character.

Embodiment of the Present Invention Using 7 Stage Units

Figure 5:
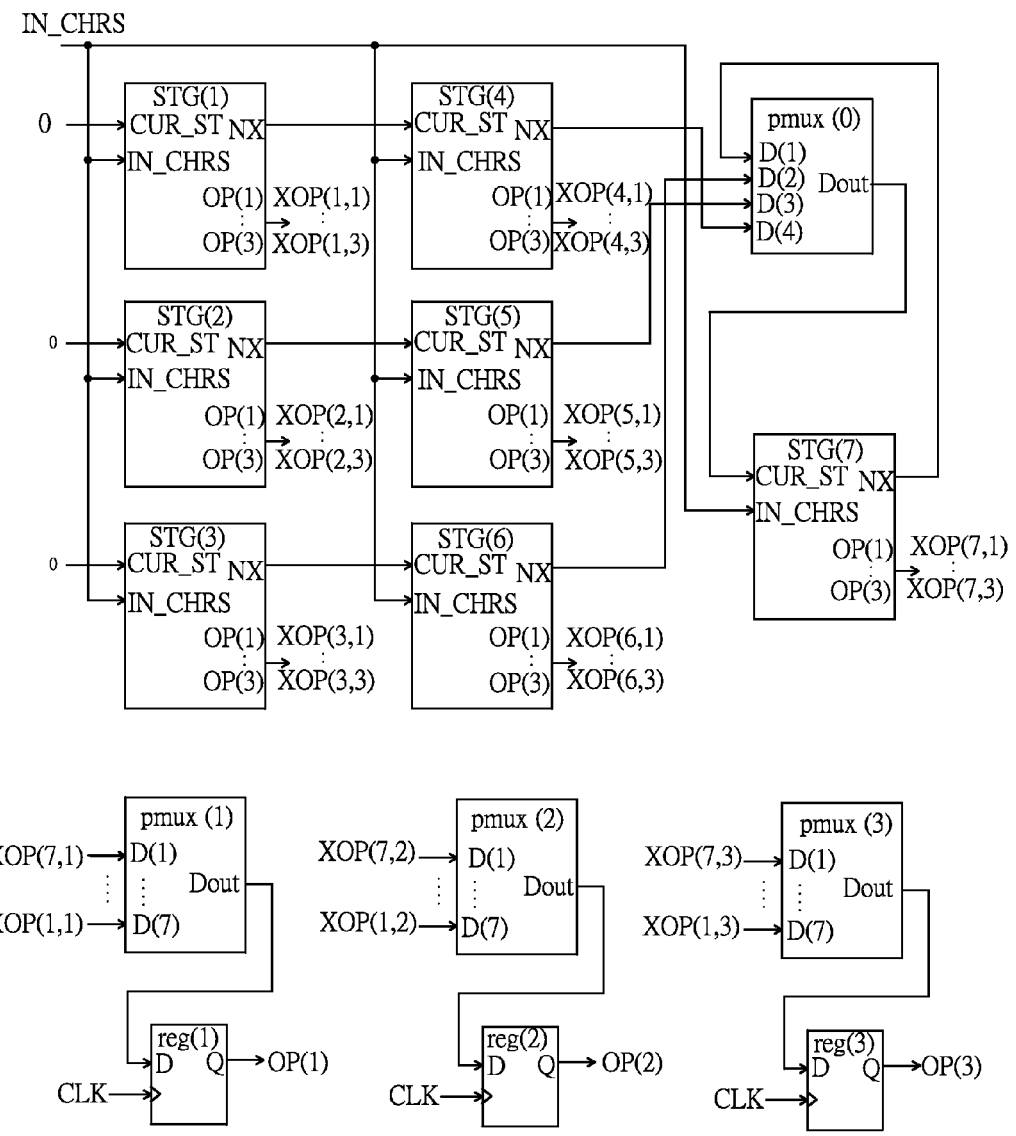
FIG. 5 illustrates a block diagram of a multi-stage parallel multi-character string matching device according to another embodiment of the present invention.

To better understand the structure of the present invention, please refer to FIG. 5, which illustrates a block diagram of a multi-stage parallel multi-character string matching device according to another embodiment of the present invention using 7 stage units to compare three characters in parallel, that is, K=3, and L=7. This embodiment compares three characters in parallel in a matching cycle, so first 6 stage units are divided into three pipelines with each including two stage units, wherein first to third ones of the stage units correspond to level 0, stage unit (1) and (2) process a situation where only last two characters of a pattern string are matched and a situation where only last one of the pattern string is matched respectively. Stage units (4)-(6) correspond to levels 1-3, and stage unit (7) corresponds to level 4 and above. The first 6 stage units operate in a way of NFA, and the last stage unit—stage unit (7)—operates in a way of DFA. Besides, a priority multiplexer pmux(0) is used to determine which of the outputs NX of the stage units (4)-(7) is to be sent to a current state input CUR_ST of the stage unit (7); and priority multiplexers pmux(1)–(3) are used to determine final matching outputs OP(1)–OP(3), which are selected from the matching outputs of the seven stage units.

The arrangement of stage units and pipelines of this block diagram is just for illustration of the structure of the present invention. In a practical application, the number of pipelines is determined by the number of characters processed in parallel in a matching cycle, and the number of stage units is determined according to application requirements.

Transition Rule Specification

Figure 1:
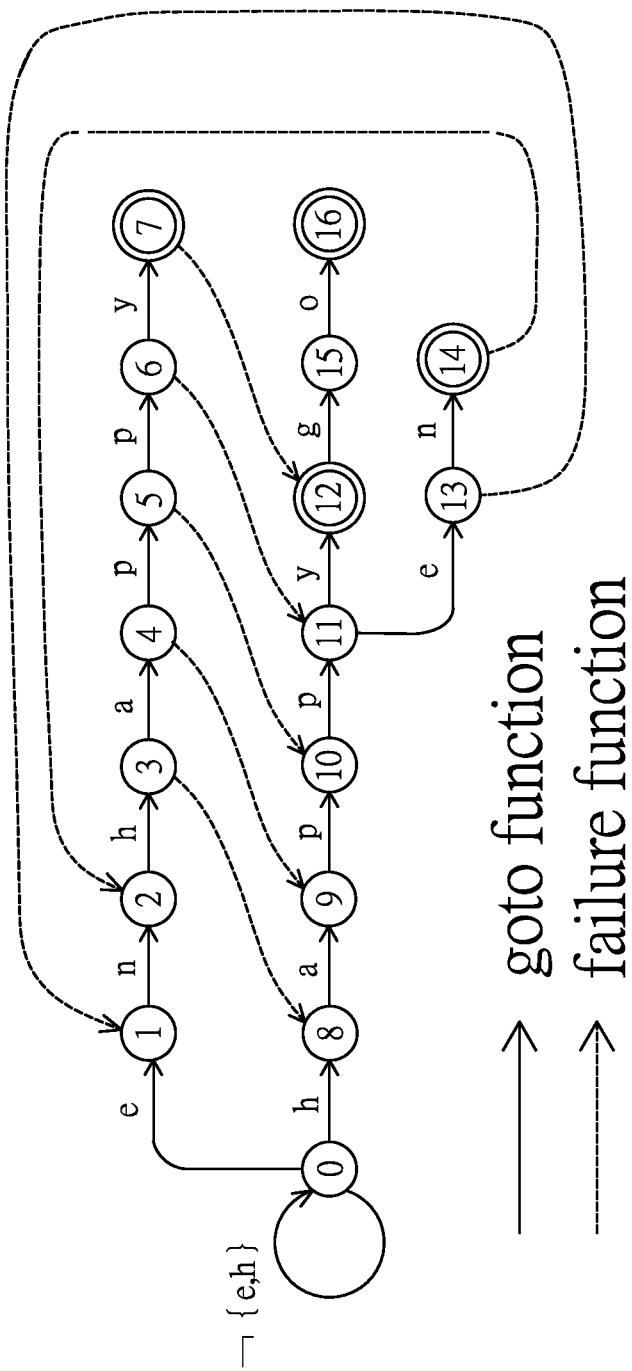
FIG. 1 illustrates an AC-trie constructed according to a keyword set {enhappy, happy, happen, happygo}.

To make the operation of the device of the present invention easily understood by readers, the transition rules will be addressed first, and then the deduction of the transition rules illustrated. An example based on a keyword set {enhappy, happy, happen, happygo} and the AC-trie of FIG. 1 is to be used to illustrate the transition rules.

FIGS. 6(*a*) and 6(*b*) illustrate a rule table having 30 transition rules, wherein FIG. 6(*a*) illustrates first to 19th rules, which are embodied by stage unit (6) and (7), and FIG. 6(*b*) illustrates the rules embodied by other stage units.

The transition rules in this transition table are allocated in an order from the one having the highest priority to the one having the lowest priority, wherein, the priorities of the rules of a subsequent stage unit are higher than those of the rules of a preceding stage unit. For example, the priorities of the rules of stage unit (7) are higher than those of the rules of stage units (1)-(6), so the rules of stage unit (7) are put at leading locations. In one stage unit, the rules for exact matching of more pattern characters have higher priorities. For example, rule 6 and 7 are allocated in stage (7), rule 6 is for exact matching of three pattern characters, rule 7 is for exact matching of two pattern characters, and the first two characters of the three pattern characters of rule 6 are "py", same as the two pattern characters of rule 7. When rule 6 is triggered, rule 7 will also be triggered, but the output of the matching result is determined by rule 6 due to its higher priority. Rule 6 will determine matching outputs of three input characters and next state at the same time, while rule 7 only determines matching outputs corresponding to the first two of the input characters but does not affect next state and the matching output of the third one of the input characters.

The first column of the rule table is rule number, which is for convenience of illustration but of no practical effect, and the rule unit does not store data of the rule number. The second column of the rule table is stage number, which represents the stage unit embodying the rule. According to the foregoing circuit architecture, the stage numbers—for indicating the stage units embodying the rules—need not be stored in registers. However, in a circuit architecture to be illustrated later, the stage numbers have to be stored in the rule units, because they will be used to control relevant data transmission circuit to select input data for the rule units and determine where output data are delivered, and thereby achieve the same function of the foregoing multi-stage units.

Other columns of the rule table include columns PMASK, P_ST, and P_CHRS for pattern data and columns OMASK, NX_ST, and OP1–OP3 for output data, wherein PMASK is a pattern mask column, P_ST is a current state column, P_CHRS is a pattern character column, OMASK is an output mask column, NX_ST is a next state column, OP1–OP3 are matching output columns The number of the pattern character P_CHRS corresponds to the number of characters processed in parallel per matching cycle. In this example, as three characters are processed at a time, therefore each transition rule has three pattern characters. The bits of PMASK correspond to current state P_ST and pattern characters P_CHRS. For example, the most significant bit (that is, bit 3) of PMASK corresponds to the current state P_ST, the second significant bit (bit 2) of PMASK corresponds to a first pattern character, and the least significant bit (bit 0) of PMASK corresponds to a last pattern character. It is to be known that this example is not intended to limit the present invention thereto. In fact, through the foregoing specification, it would be easy for a person having ordinary skill in the art to come up with a variety of data formats to attain the mentioned functions.

When a pattern mask bit is '1', it means that a corresponding pattern data is to be used in a string matching; when it is '0', it means that the corresponding pattern data is ignored (don't-care). To make the expression easy to read, a wildcard character '?' is used in P_CHRS to indicate that a corresponding pattern character is in don't-care condition. For example, when bit 2, bit 1, and bit 0 of PMASK are '0', '0', and '1' respectively, the first pattern character and the second pattern character are both '?' indicating that no matter what the first input character and the second input character are, they are viewed as matching characters, and only the third input character has to undergo a matching process. In the stage unit (2), only the second bit and third bit of P_CHRS have to undergo a matching process. The column P_ST of the rule table represents current state of the pattern data. In preceding stage units (1)-(3), P_ST does not undergo a matching process, only P_CHRS does. To make the format of the rules consistent, P_ST of the pattern data is indicated, and the bit 3 of PMASK in the transition rule is used to determine whether the current state is to undergo a matching process.

The corresponding AC-trie level of each stage unit can be seen from the transition rule table. For example, P_ST of the pattern data of the transition rules of the stage units (1)-(3) are all 0, indicating that the stage units (1)-(3) correspond to level 0; P_ST of the pattern data of the transition rules of the stage unit (4) are 1 and 8, which are attributed to level 1 in the AC-trie, indicating that the stage unit (4) corresponds to level 1; P_ST of the pattern data of the transition rules of the stage unit (5) are 2 and 9, which are attributed to level 2 in the AC-trie, indicating that the stage unit (5) corresponds to level 2; likewise, the stage unit (6) corresponds to level 3 in the AC-trie, and the stage unit (7) corresponds to level 4 and above in the AC-trie.

When the pattern data of a transition rule matches a current state CUR_ST and input characters IN_CHRS, the transition rule will be triggered and generate output data to be used in determining a next state NX and matching outputs OP(1)–OP(3) of a stage unit embodying the transition rule.

NX_ST of the transition rules represents next state. In each matching cycle, of the triggered transition rules in a preceding stage unit, a next state of the one having the highest priority will be sent to a subsequent stage unit located in the same pipe with the preceding stage unit. For example, in a matching cycle (three characters are processed at a time), a next state determined by stage (3) will be sent to stage (6) to serve as current state, and a next state determined by stage (4) will be sent to stage (7). If no transition rule is triggered, then the stage unit will output a next state of 0. OP1, OP2, and OP3 of a transition rule corresponds to matching output of first, second, and third ones of input characters respectively. Likewise, in each matching cycle, of the triggered transition rules in a stage unit, a matching output of the one having the highest priority will serve as a matching output of the stage unit.

The most significant bit (bit 3) of OMASK corresponds to next state NX_ST, and the other bits each correspond to an output string. For example, the second significant bit (bit 2) of OMASK corresponds to the first matching output OP1, and the least significant bit (bit 0) of OMASK corresponds to the last matching output OP3. When a bit of OMASK is '0', it means that data corresponding to the bit is invalid. For example, bit 3 and bit 0 of OMASK in transition rule 5 are both 0, indicating that NX_ST and OP3 of the transition rule 5 are invalid, i.e., when the transition rule 5 is triggered, it will not be used to determine next state and matching string output of the third character of the input characters. It can be seen from the rule table that when the last ones of the pattern characters P_CHRS are wildcard characters, bit 3 of OMASK will be '0', indicating that this rule only determine matching outputs but not next state. For example, in rule 4, as the pattern characters P_CHRS are "y??", therefore rule 4 does not determine next state.

As output strings have different lengths, to facilitate hardware design, state numbers corresponding to matching output strings can be stored in data registers. For example, state number 16 is used to represent the output string "happygo" of OP3 of transition rule 3 of the rule table. Through the foregoing specification, it would be easy for a person having ordinary skill in the art to come up with other ways of representing the output strings with code numbers.

Operation Specification

The operation of string matching will be explained below with reference to the hardware structure and transition rules of the foregoing multi-stage parallel multi-character string matching device.

First, the present invention defines a matching cycle as: starting from receiving K input characters, and ending at an instant when each stage unit of the present invention's device has determined a next state and the present invention's device has output K matching output strings. According to the design of the present invention, a matching cycle is a cycle of the clock signal CLK. Taking the transition rules of the string matching device of FIG. 5 as an example, as three input characters can be processed in a matching cycle, K is then equal to 3.

Before operation, the transition rules of each stage unit are generated according to assigned keywords, and then stored into the rule units of each stage unit of the string matching device. When keywords are to be changed, the transition rules have to be re-generated according to new keywords, and then stored into the rule units. As the revalent circuit for setting data is easy for a person having ordinary skill in the art, it is not addressed here.

Before starting a string matching, control signals (not illustrated in the figures) are used to initialize all registers to set the current state of each stage unit as 0, and the output strings as empty strings. When the string matching begins, a string to be matched, starting from a first character, is sent to the string matching device in response to the clock signal CLK with K characters at a time.

In each stage unit, the K characters to be matched are input via the input end IN_CHRS and current state is input via the input end CUR_ST. For stage unit (i), the input end CUR_ST receives a next state delivered from the output end NX of stage unit (i–K) and takes it as current state. The input end CUR_ST of the first K stage units (1)–(K) are fed with state 0.

In each stage unit, the input characters received via IN_CHRS and input current state received via CUR_ST will be sent to all the rule units (1)–(M) thereof. Each rule unit performs a matching operation on the input characters and the input current state according to pattern data P_ST and P_CHRS and pattern mask PMASK. If the input characters and current state match with the pattern data stored thereof, then corresponding next state and matching outputs will be delivered according to OMASK, NX_ST, and OP(1)–OP(K) of the transition rules. The output data of all the rule units are then processed by priority multiplexers pmux(0)–(K) to determine data for NX_ST and OP(1)–OP(K) of the stage unit, wherein the data for NX_ST will be stored into register REG0 under the control of the clock signal CLK, and delivered to a subsequent stage unit via the output end NX. For example, a next state delivered by the output end NX of stage unit (i) will be sent to the input end CUR_ST of stage unit (i+K), and data delivered via OP(1)–OP(K) of each stage unit will be processed by the priority multiplexers pmux(1)–(K) of FIG. 3 to generate final matching outputs.

If the matching result of a rule unit is negative, then the output data of the rule unit are invalid and have no effect on the final result.

After a set of K characters are processed, a next set of K characters will be received for a next matching cycle to proceed with.

String Matching Example

To better understand the operation of the present invention, please refer to FIGS. 7(a) and 7(b), which illustrate a matching example. The input string for matching is "enhappenhappygo", which is divided into "enh", "app", "enh", "app", and "ygo" for matching sequentially, because three characters are processed at a time in this example.

Before the matching, all the registers will be initialized. In the first matching cycle, rule 25 and 30 will be triggered in response to the input characters "enh", wherein rule 30 belongs to stage unit (1), and rule 25 belongs to stage unit (3). Rule 30 will determine next state as 8 and send it to stage unit (4), which is subsequent to stage unit (1), to serve as current state of stage unit (4) in next matching cycle. Rule 25 will determine next state as 3 and send it to stage unit (6), which is subsequent to stage unit (3), to serve as current state of stage unit (6) in next matching cycle. Besides, the matching outputs determined by the two triggered rules are both empty string.

In second matching cycle, rule 16 and 24 will be triggered in response to input characters "app" and the next state determined in the preceding matching cycle, wherein rule 24 belongs to stage unit (4), and rule 16 belongs to stage unit (6).

Rule 24 will determine next state as 11, and rule 16 will determine next state as 6. The next states determined by stage unit (4) and (6) will be sent to priority multiplexer pmux (0). As the output of stage unit (6) has a higher priority, therefore priority multiplexer pmux (0) will determine next state as 6, and send it to the last stage unit—stage unit (7)—to serve as current state of stage unit (7) in next matching cycle. Besides, the matching outputs determined by the two triggered rules are both empty string.

In third matching cycle, rule 13, 25, and 30 will be triggered in response to input characters "enh" and the next state determined in the preceding matching cycle, wherein rule 30 belongs to stage unit (1), rule 25 belongs to stage unit (3), and rule 13 belongs to stage unit (7). Rule 13 does not determine valid next state, but determines matching output OP2 as 14, which represents "happen". Rule 30 will determine next state as 8 and send it to stage unit (4), which is subsequent to stage unit (1), to serve as current state of stage unit (4) in next matching cycle. Rule 25 will determine next state as 3 and send it to stage (6), which is subsequent to stage unit (3), to serve as current state of stage unit (6) in next matching cycle. Priority multiplexer pmux (2) will determine final output OP2 as 14, OP1 and OP3 as empty string according to the triggered rules, indicating that the matching result corresponding to the second input character is "happen" after this matching cycle.

In fourth matching cycle, rule 16 and 24 will be triggered in response to input characters "app" and the next state determined in the preceding matching cycle, wherein rule 24 belongs to stage unit (4), and rule 16 belongs to stage unit (6). Rule 24 will determine next state as 11, and rule will determine next state as 6. The next state of 11 and 6 output by stage (4) and (6) are compared by priority multiplexer pmux (0) according to a priority rule, and next state of 6 is selected to serve as current state of the last stage unit—stage unit (7)—in next matching cycle. Besides, the matching outputs determined by the two triggered rules are both empty string.

In fifth matching cycle, rule 11 and 12, which both belong to stage unit (7), will be triggered in response to input characters "ygo" and the next state determined in the preceding matching cycle. Rule 11 will determine next state as 16, matching output OP1 as 7 (corresponding to the output string "enhappy happy"), and matching output OP3 as 16 (corresponding to the output string "happygo"). Rule 11 does not determine valid next state, but determines matching output OP1 as 7. As a result, stage unit (7) determines next state as 16 and sends it to stage unit (7) to serve as current state in next matching cycle. As rule 11 has higher priority, therefore it determines the final matching output OP1 as 7, OP3 as 16, and OP2 as empty string.

Deduction of Multi-Character Transition Functions and Generation of Transition Rules The present invention proposes a simple and effective method capable of using an AC-trie to generate transition rules for matching multiple characters in parallel. The present invention's method of generating transition rules is explained below.

Before deduction of multi-character transition rules, the present invention derives one-character transition functions from the goto functions and failure functions of an AC-trie. The present invention then uses the one-character transition functions to derive multi-character transition functions, and generates transition rules based on the multi-character transition functions.

The transition function out of state 0 is expressed as $NX_1(0, \neg \{e, h\})=0$, wherein $\neg \{e, h\}$ indicates any character other than 'e' and 'h'. In the specification of the rules of the present invention, the wildcard character '?' is used to represent $\neg \{e, h\}$, and in the hardware realization of the rules of the present invention, $\neg \{e, h\}$ is implemented by masking, that is, by setting its corresponding pattern mask bit as '0' to make it match with any character. As the priority of the rule having a wildcard character '?' is lower than the priority of the rule of exact matching, the final result will be determined by the result of the exact matching.

In the AC-trie, if a failure function of a state causes a transition to another state other than the initial state, it indicates that the two states share a common string. Therefore, when none of the transition rules of all the states causes a transition, the transition rules out of the initial state will be evaluated. Based on this fact, multiple rules can take effect simultaneously to match characters at different positions in parallel via hardware resources during a parallel multi-character matching.

Besides, no matter what the number K of the characters to be processed in parallel is, the number of states will stay unchanged. The reason is that, the final states derived by using the transition rules of different character sizes based on a same keyword to process a same input string are the same. As a result, the transition rules of different character sizes can be used to process same keyword.

To facilitate the deduction, a K-character transition function is defined as $NX_K(S_1, T)=S_2$, wherein $S_1$ is current state, T is a string of K characters, and $S_2$ is next state. The operation of this transition function is to change states from $S_1$ to $S_2$ in response to an input string T of K characters. For example, a 3-character transition function $NX_3(1, nha)=4$ will change states from 1 to 4 in response to an input 3-character string "nha". A 3-character string matching device of the present invention is used to implement a 3-character transition function.

Besides, the present invention calls the transition function $NX_K(S_2, T_2)=S_3$ as a successive transition function of the transition function $NX_1(S_1, T_1)=S_e$ if $S_2=S_e$, i.e., if the initial state of $NX_K(S_2, T_2)=S_3$ is the ending state of $NX_1(S_1, T_1)=S_e$.

The present invention is capable of concatenating a transition function with a subsequent transition function to form a new multi-character transition function. The concatenating operation is defined as below.

Definition (of concatenation of two transition functions): given a K-character transition function $NX_K(S_1, T_1)=S_2$ and a L-character transition function $NX_L(S_2, T_2)=S_3$, wherein $S_1$, $S_2$, and $S_3$ are states, $T_1$ is a K-character string and $T_2$ is a L-character string, a concatenation of the two transition functions is one resulting in a (K+L)-character transition function $NX_{K+L}(S_1, T_1T_2)=S_3$.

Figure 9:
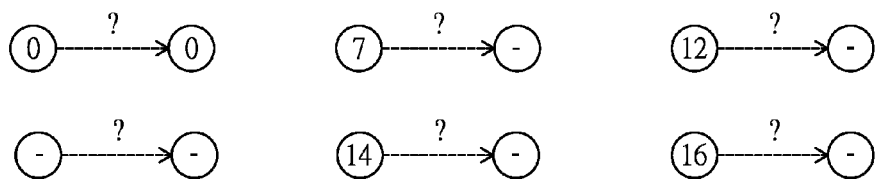
FIG. 9 illustrates examples of assistant transition function of the present invention.

Besides, the present invention also defines a pseudo state and two assistant transition functions. In FIG. 9, the symbol '–' represents the pseudo state, which is not a practical state in the AC-trie but is defined for constructing a complete transition function. Besides, the symbol "?" represents an arbitrary character. In addition, the present invention defines two assistant transition functions to assist constructing a complete multi-character transition function of output state.

A first assistant transition function is defined as $NX_1(-, ?)=-$, which transits from a pseudo state to another pseudo state in response to an arbitrary character. The second assistant transition function is defined as $NX_1(S_{op}, ?)=-$, which transits from an output state $S_{op}$ to a pseudo state in response to an arbitrary character.

FIG. 9 illustrates examples of the defined assistant transition functions. To distinguish with practical transition functions, dash lines are used in the figure to indicate assistant transition functions. $NX_1(0, ?)=0$ is not one of the defined assistant transition functions, but one derived from replacing ¬{e, h} in NX$_1$(0, ¬{e, h})=0 with the wildcard character '?' for solving an alignment problem. An assistant transition function NX$_1$ (S$_{op}$, ?)=– is used for keeping a matching output of an output state S$_{op}$. As a result, the assistant transition function indicated by a dash line will be added into each of the states having a matching output, such as state 7, 12, 14, and 16, to assist deriving multi-character transition functions. NX$_1$(–, ?)=– is an additional 1-character assistant transition function for assisting constructing a complete multi-character transition function after an output state. The wildcard character '?' and pseudo state '–' are proposed for constructing multi-character transition functions, while pattern mask PMASK and output mask OMASK have corresponding bits to control practical transition rules of the multi-character transition functions.

A 3-character transition function example below is used to further illustrate the process of deduction of the multi-character transition functions.

During the deduction, the present invention uses 1-character transition functions derived from the AC-trie as a basis, and repeats the concatenation operations to get the multi-character transition functions. Based on the hardware architecture proposed by the present invention, the present invention uses two methods to derive the 1-character transition functions, wherein first one is for deriving transition functions used by the stage units of pipelines, and second one is for deriving transition functions used by the last stage unit.

Figure 8:
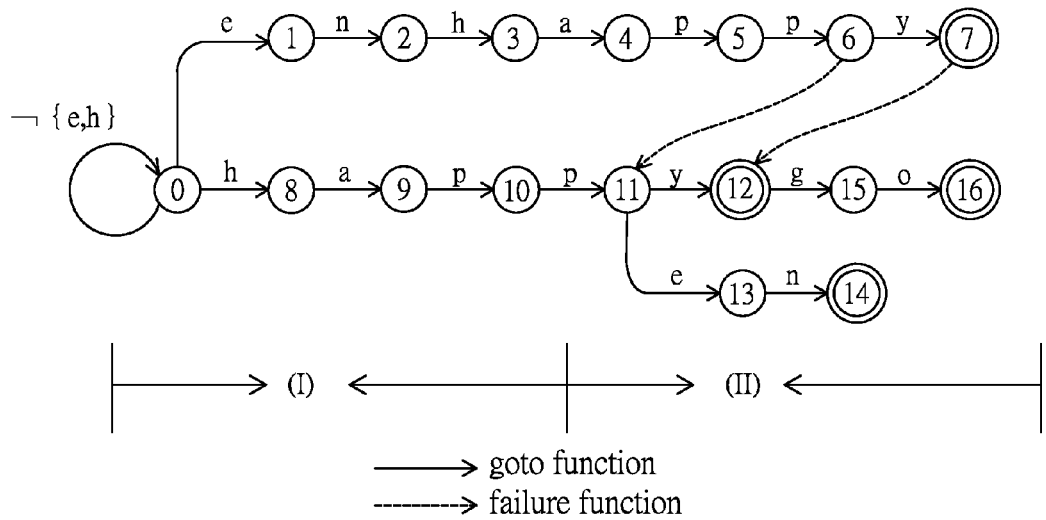
FIG. 8 is an illustrative diagram, in which the AC-trie of FIG. 1 is divided by the present invention into two parts for two different types of transition functions.

An architecture of a 7-stage 3-character string matching device is illustrated below with reference to FIG. 5. As illustrated in FIG. 8, the present invention divides the AC-trie of FIG. 1 into two parts, of which a left part includes states in from level 0 to level 3, and a right part includes states in level 4 and above. As the left part is used to derive the transition functions used in the stage units of the pipelines which need not consider the failure functions, therefore the dash lines for indicating the failure functions are removed. The right part is used to derive the transition functions used in the last stage unit, so the failure functions are reserved. The division of the left part and the right part is determined according to the number of stage units of the string matching device. For example, as illustrated in FIG. 7, there are 6 stage units in 3 pipelines, so level 0 to 3 of the AC-trie are used for NFA operation.

Figure 10:
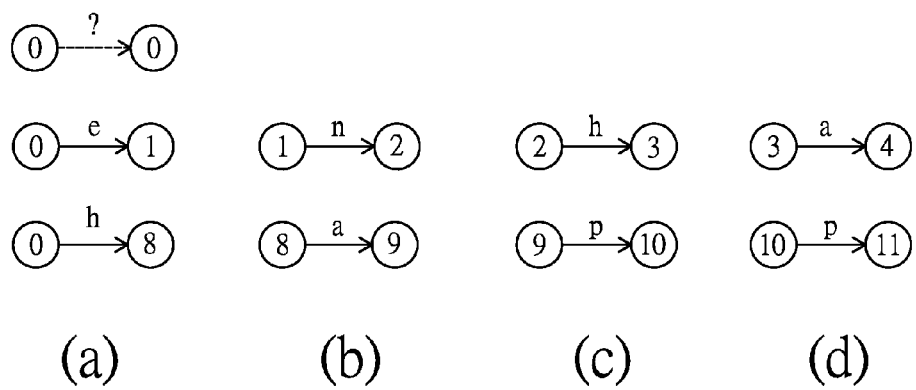

FIG. 10 illustrates 1-character transition functions of from level 0 to level 3, wherein, as the failure functions need not be considered, the 1-character transition functions are derived directly from the goto functions of the AC-trie of FIG. 1. As illustrated in FIG. 10, the 1-character transition functions out of the states in a same level are attributed to a group. For example, the 1-character transition functions in group (a) are of level 0, which only includes the initial state 0. As mentioned above, the transition function NX$_1$(0, ?)=0 is used to handle the alignment problem of the keyword not in alignment with the starting character of the input string. The 1-character transition functions in group (b) are of level 1, which includes state 1 and 8. The 1-character transition functions in group (c) are of level 2, which includes state 2 and 9. The 1-character transition functions in group (d) are of level 3, which includes state 3 and 10.

FIG. 11 illustrates the 1-character transition functions of from level 4 to 7, wherein, the 1-character transition functions derived from the failure function are indicated by dash lines. The 1-character transition functions in group (a) are of level 4, which includes state 4 and 11. The 1-character transition functions in group (b) are of level 5, which includes state 5, 12, and 13, wherein state 12 has a matching output, so it further includes an assistant transition function NX$_1$(12, ?)=–. The 1-character transition functions in group (c) are of level 6, which includes state 6, 14, and 15, wherein state 14 further includes an assistant transition function NX$_1$(14, ?)=–, while state 6 further includes a transition function NX$_1$(6, e)=13 as its failure function causes a transition to state 11. To make the diagram easy to read, the transition functions added due to the failure function are indicated by dash lines. The 1-character transition functions in group (d) are of level 7, which includes state 7, and 16, wherein state 7 further includes a transition function NX$_1$(7, g)=15 as its failure function causes a transition to state 12, and state 16 further includes an assistant transition function NX$_1$(16, ?)=–.

Figure 12:
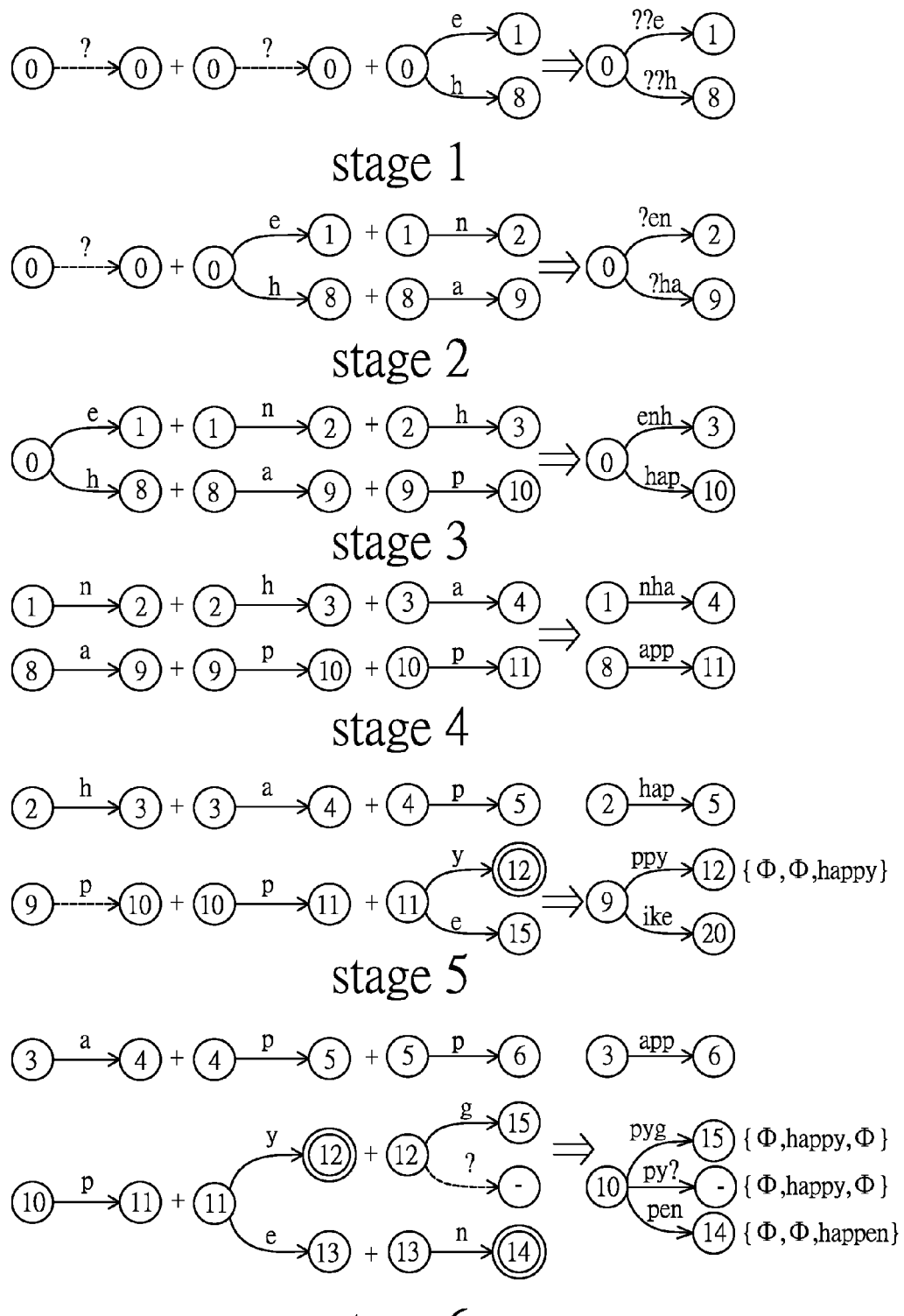
FIG. 12-13 illustrate an embodiment of 3-character transition functions of the present invention.
Figure 13:
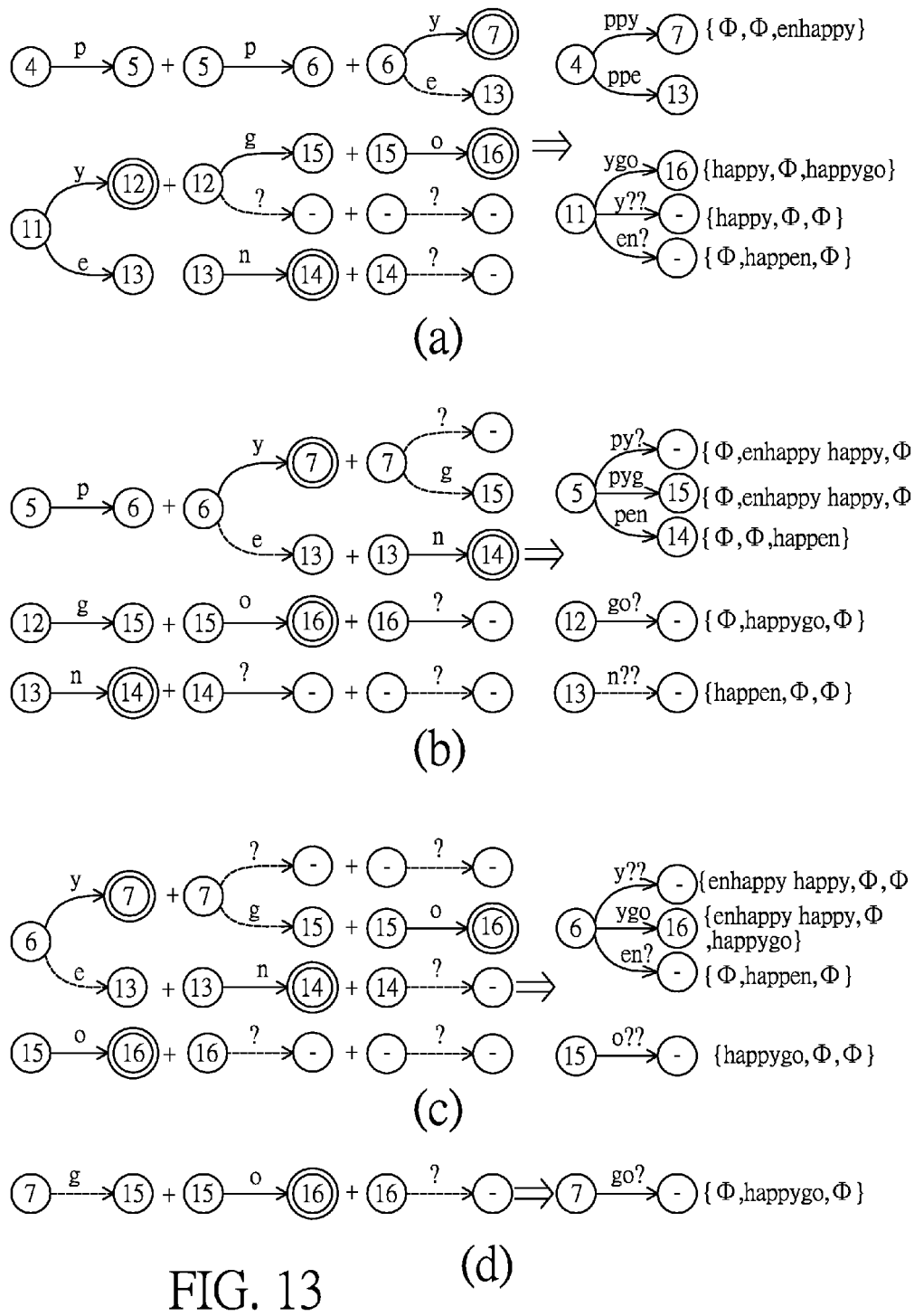

FIGS. 12 and 13 are used to illustrate a deduction process of 3-character transition functions by performing concatenation operation on the 1-character transition functions mentioned above, wherein, symbol '+' represents concatenation of two transition functions. FIG. 12 illustrates the 3-character transition functions used in the first 6 stage units, and FIG. 13 illustrates the 3-character transition functions used in the 7th stage unit, wherein the left side of '→' is a process of concatenation, the right side of '→' is a result of the concatenation. To make the figures easy to read, the FIGS. 12, 13 only indicate the matching outputs of non-empty string. In FIG. 12, group (a) illustrates a deduction process of 3-character transition functions of stage 1, which first concatenates the first two 1-character transition functions—both being NX$_1$(0, ?)=0, and then concatenates the result with two 1-character transition functions—NX$_1$(0, e)=1 and NX$_1$(0, h)=8—of state 0 respectively to get two 3-character transition functions—NX$_3$(0, ??e)=1 and NX$_3$(0, ??h)=8, wherein the first two transition functions—both being NX$_1$(0, ?)=0—indicates that it will stay at the initial state, and the third transition function indicates that it will change states to state 1 or 8 of level 1 if the third character is "e" or "h". Likewise, group (b) first concatenates NX$_1$(0, ?)=0 with two 1-character transition functions of state 0, and then concatenates the result with two 1-character transition functions—one of state 1 and the other of state 8—respectively to get two 3-character transition functions—NX$_3$(0, ?en)=2 and NX$_3$(0, ?ha)=9.

The 3-character transition functions of stage 1 and 2 can be used to handle the alignment problem of multi-character string matching. The 3-character transition function of stage 1 ignores the first two input characters—represented by two wildcard characters "?", and only matches the last input character, so as to make the first character of a pattern string in alignment with the third character of an input string. The 3-character transition function of stage 2 ignores the first input character—represented by the wildcard character "?", and only matches the last two input characters, so as to make the first character of a pattern string in alignment with the second character of an input string.

Based on the above method, 3-character transition functions of stage 3 to 7 can be derived by using the concatenation operation.

With the foregoing specification, it would be easy for a person having ordinary skill in the art to derive multi-character transition functions of any number of characters. After deriving the multi-character transition functions, the needed multi-character transition rules can be derived thereby.

Algorithm

A method of generating K-character transition functions from 1-character transition functions is specified below with reference to an algorithm of a program. As deriving 1-character transition functions from an AC-trie is straightforward and easy for a person having ordinary skill in the art after reading the specification above, therefore it is skipped here.

As for the major part of the algorithm, please refer to FIG. 14, which illustrates an algorithm for constructing K-character transition functions.

An input parameter K of the algorithm stands for the number of characters to be processed in parallel. An input parameter NXSET includes original 1-character transition functions, and a variable TRSET is used to store results of the algorithm, which are K-character transition functions. The returned K-character transition functions are used to generate multi-character transition rules for the present invention's string matching device. The algorithm utilizes multiple loops to operate on each state of an AC-trie to derive corresponding K-character transition functions.

In the second column from "begin", TRSET is cleared. In a loop from the third column to 21th column, every state Si of AC-trie is handled to derive its corresponding K-character transition functions. In column 5, the 1-character transition functions of state Si are copied to NSET.

Repeat execution of a loop from column 7 to 19 K−1 times, and use an iterative way to concatenate a 1-character transition function of Si with subsequent K−1 1-character transition functions, and K-character transition functions of Si are derived. After repeating the loop from column 7 to 19 K−1 times, NSET has all the K-character transition functions out of Si. In column 20, NSET is merged into TRSET, and the process returns to column 5 to proceed with next state. When all the states are processed, the algorithm ends.

The description below is for a further discussion of the loop from column 7 to 19. In column 8, TMPSET is cleared; the loop from column 10 to 17 is executed once per transition function NXi stored in NSET. In column 11, next state of NXi is assigned to NX_ST. The loop from column 13 to 16 is executed once per transition function NXj out of NX_ST. In column 14, transition function NXj is concatenated with transition function NXi to form a new transition function NEW_TR. In column 15, NEW_TR is merged into TMPSET. It is noted that the number of pattern characters of transition function NEW_TR is larger than the number of transition function NXi by one. In the mentioned concatenation process, the multi-character transition functions derived can be all formed by the assistant transition functions, and the transition functions not used are removed in column 22.

After deriving the multi-character transition functions according to the foregoing algorithm specification, the derived multi-character transition functions can therefore be used to generate the multi-character transition rules for the present invention's string matching device. After K-character transition rules are generated, they are reordered with the rules in a subsequent stage having a priority higher than that of the rules in a preceding stage. For example, stage 7 has the highest priority, and stage 1 has the lowest priority. In a same stage, a pattern of exact matching has a priority higher than that of a pattern of partial matching. For example, in the rule tables of FIG. 6(*a*)-6(*b*), rules out of a same state (in the p_st column of the table) are collected together. For example, rule 3 and 4 are both out of state 11, rule 3 has a pattern string of "ygo", and rule 4 has a pattern string of "y??", of which the last two characters are ignored, so rule 4 has a lower priority.

A simple realization for the requirements above is to prioritize the stage units first, and then prioritize binary values of pattern mask PMASK—the larger the value, the higher the priority. For example, PMASK of rule 3 is "1111", and PMASK of rule 4 is "1100", which is smaller than "1111", so rule 4 is placed after rule 3. Although the prioritization of the rules in the foregoing example is not performed according to binary values of pattern mask PMASK, it would be easy for a person having ordinary skill in the art to do so with reference to the specification in this paragraph.

For each 1-character transition function, its matching output can be represented by its next state. However, for multi-character transition functions, K-character transition functions with K>1 for example, if each of the K-character transition functions only outputs next state, the information of the states inside the transition will be hidden. Under this circumstance, only the matching output for the last input character is provided, and the matching outputs for the first K−1 input characters will be missing. As a remedy, when using the foregoing algorithm to derive multi-character transition functions, the matching outputs generated in the concatenation process for the first K−1 input characters should be reserved. Although this part is not mentioned in the foregoing algorithm, however, it would be reasonable to say that a person having ordinary skill in the art can easily attain it.

Adaptive Structure Having Configurable Rule Units

In the foregoing realization, the stage number is fixed. However, when the keyword to be matched is changed, the number of transition rules in each stage unit will be different, and it will cause a problem in hardware design—the number of rule units in each stage unit cannot be configured adaptively. In view of the issue, the present invention further proposes a parallel multi-character string matching device, which is capable of adaptively configuring a corresponding stage unit of each rule unit.

In this architecture, all the rule units are stored in the rule circuit, and each of the rule units has stage information for determining a stage it belongs to. As a result, the rule circuit can assign each of the rule units to any stage. To distinguish with the rule units mentioned above, the present invention names them as general rule units in specification below. When the keyword string is changed, what has to be done is to generate new rules and update the rule data. In explaining the design of this architecture, the present invention assumes the number of characters to be processed at a time is K, and the number of stages needed is L, and the number of the general rule units is M. For example, if three characters are to be processed at a time and seven stages are used, then K=3, and L=7.

Figure 15:
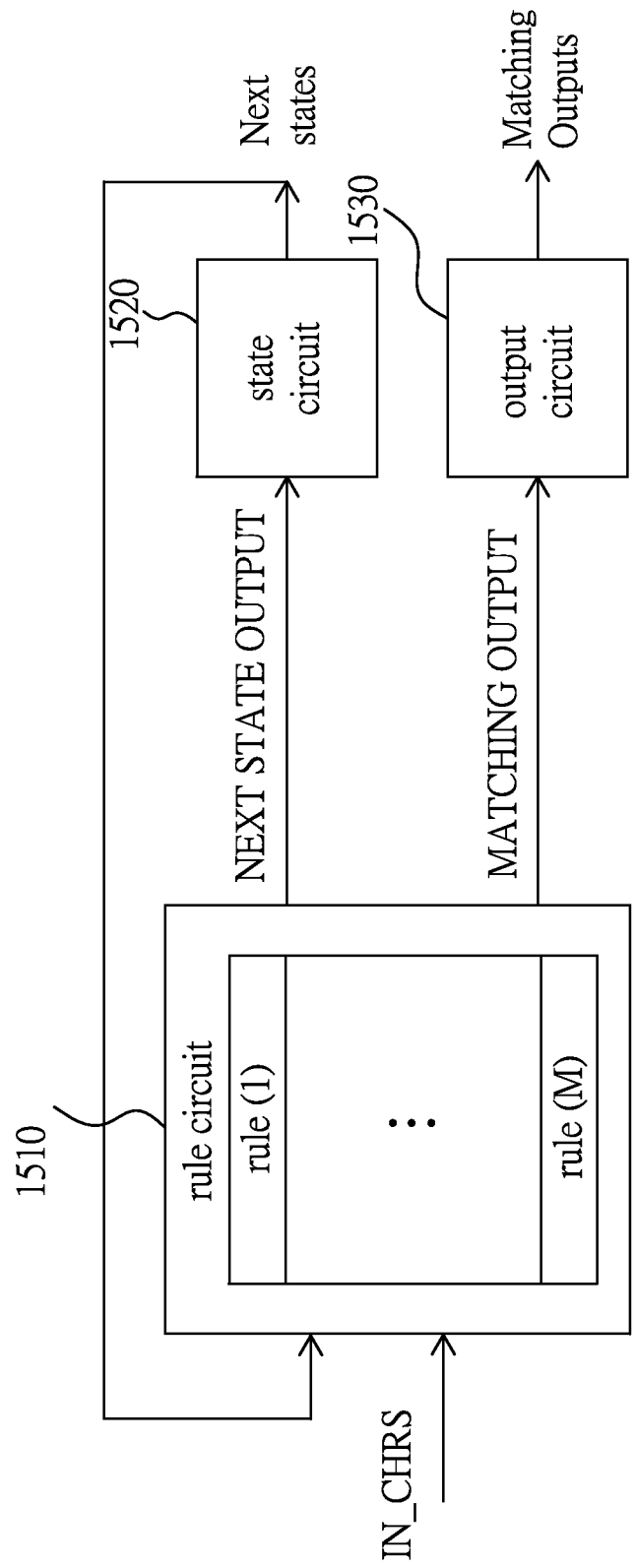
FIG. 15 illustrates a block diagram of a multi-stage parallel multi-character string matching device according to a preferred embodiment of the present invention.

FIG. 15 illustrates a block diagram of a multi-stage parallel multi-character string matching device utilizing an adaptive structure having configurable rule units according to a preferred embodiment of the present invention. As illustrated in FIG. 15, the device includes a rule circuit 1510, a state circuit 1520, and an output circuit 1530.

Figure 16:
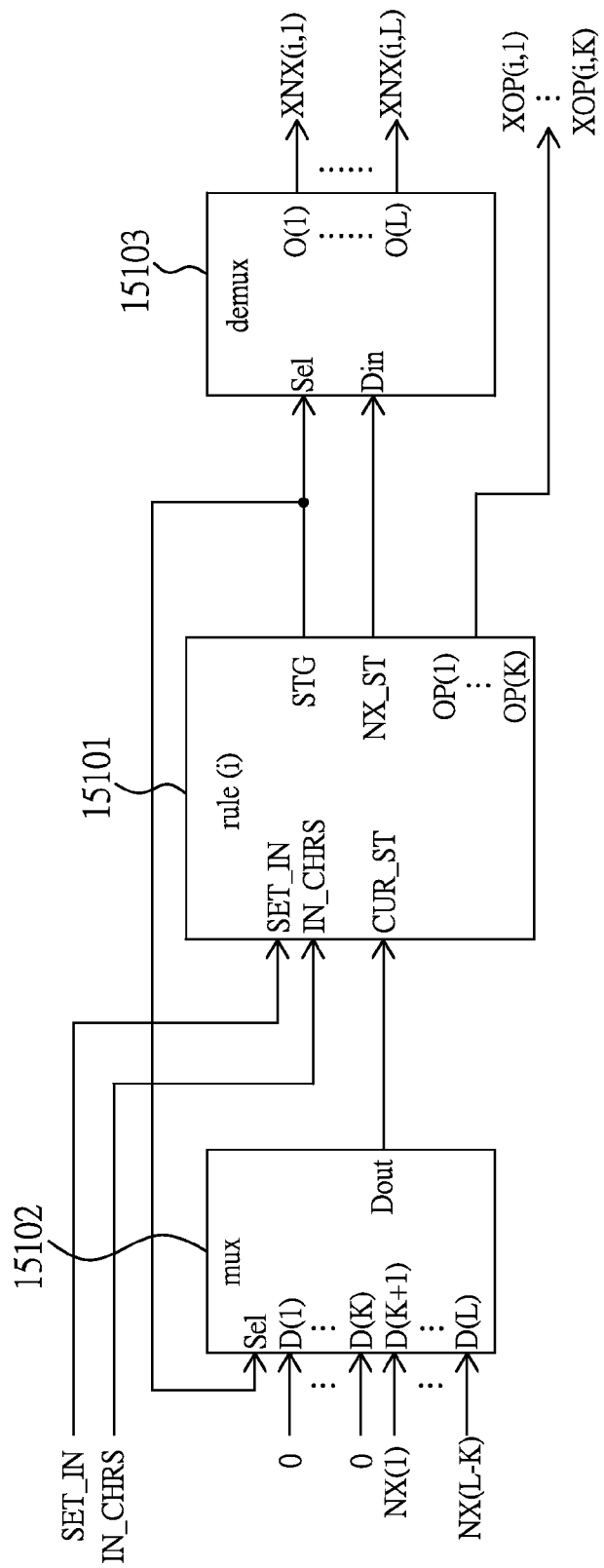
FIG. 16 illustrates a block diagram of an embodiment of a general rule unit of FIG. 15.

Rule circuit 1510 has M general rule units, of which each has a string input end, N current state input ends, L next state output ends, and K matching output ends, wherein, M, N, L, K are positive integers, L is larger than K, and N=L−K; and of which each has a transition rule based on an AC-trie. FIG. 16 illustrates a block diagram of an embodiment of the general rule unit, which includes a rule unit 15101, a multiplexer 15102, and a demultiplexer 15103. The transition rules in the rule unit 15101 are basically same as those in the rule unit 410, except that the rule unit 15101 further includes stage information in its output data. In comparison: for the rule unit 410, as the rule units 410 are stored in corresponding stages, therefore, each rule needs not provide stage information; for the rule unit 15101, each rule thereof has to provide stage information.

The rule unit 15101 performs a matching operation on input characters and states according to its stored rule information to determine next state NX_ST and matching outputs OP(1)–OP(K). In operation, each rule unit 15101 selects a corresponding next state in preceding matching cycle as current state by the multiplexer 15102 responding to a stage number, and the demultiplexer 15103 will determine a next state according to the stage number and send it to a priority multiplexer of a corresponding stage unit. In the figure, NX(i) represents ith next state output by the state circuit 1520. NX(i) is next state output by stage unit (i) when i=1 to L−K−1. NX(L−K) is determined according to the next states of stage unit (L−K) to stage unit (L) (illustrated in FIG. 17). XOP(i, j) represents a matching output of rule unit (i) in response to jth input character. XNX(i, j) represents a next state corresponding to stage unit (j) and output by ith rule unit. In each rule unit, the multiplexer 15102 has L input ends, wherein the first K input ends are coupled with 0, and the rest of the input ends are coupled with NX(1) to NX(L−K).

Figure 17:
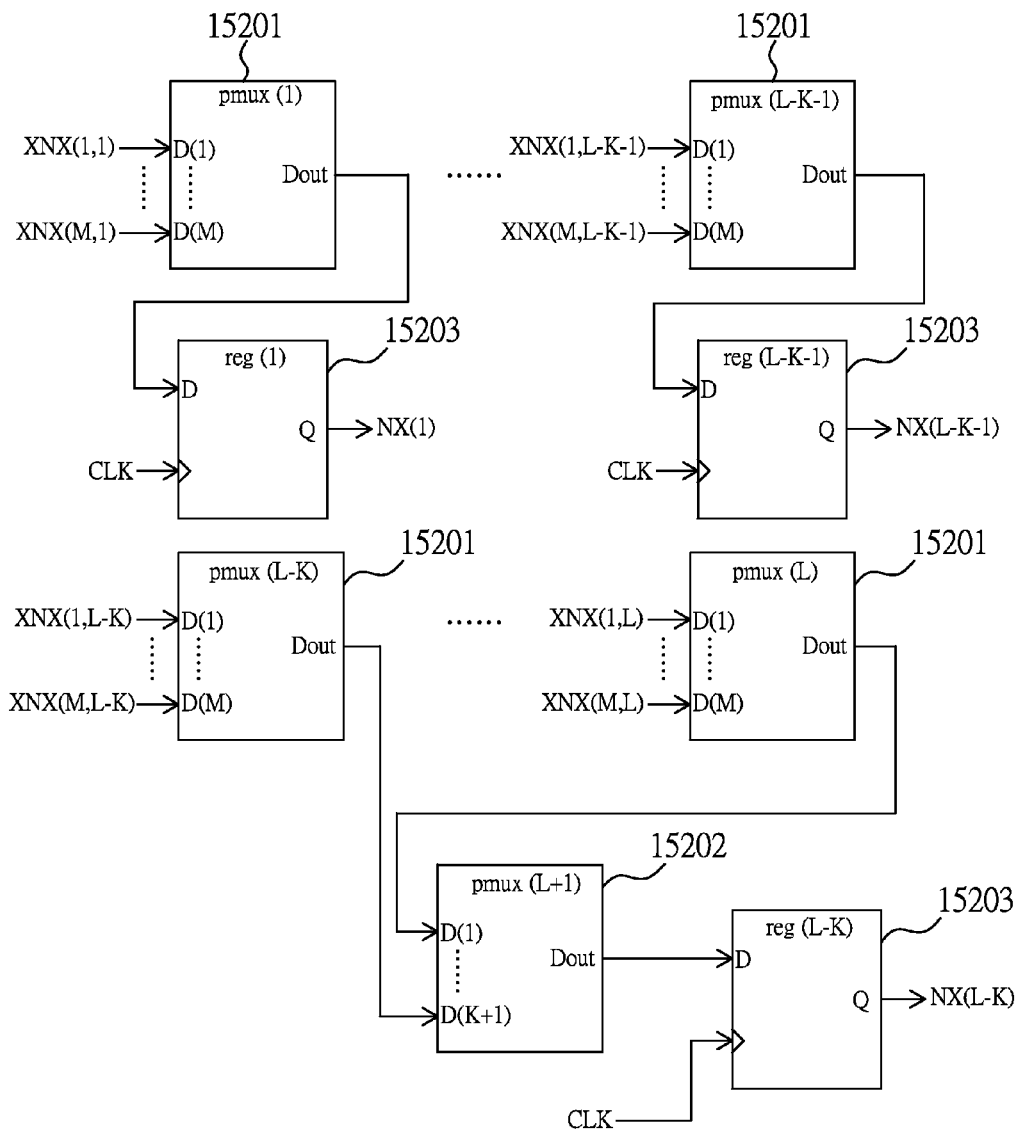
FIG. 17 illustrates a block diagram of an embodiment of a state circuit of FIG. 15.

FIG. 17 illustrates a block diagram of an embodiment of the state circuit 1520, which includes L first priority multiplexers 15201, a second priority multiplexer 15202, and multiple registers 15203. Each of the first priority multiplexers 15201 has M first input end and a first output end, the second priority multiplexer 15202 has K+1 second input ends and a second output end, wherein an Ith one of the first priority multiplexers 15201 has a Jth one of the first input ends coupled to an Ith one of the next state output ends of a Jth one of the rule units, J=1 to M, I=1 to L, I, J being positive integers, wherein, the first output ends of first to (L−K−1)th ones of the first priority multiplexers 15201 are coupled to first to (L−K−1)th ones of the current state input ends of the rule circuit 1510 respectively; a Pth one of the second input ends of the second priority multiplexer 15202 is coupled to the first output end of an (L−P+1)th one of the first priority multiplexers 15201, P=1 to K+1, P being a positive integer, and the second output end of the second priority multiplexer 15202 is coupled to an (L−K)th one of the current state input ends of the rule circuit 1510. Besides, the registers 15203 are used for temporary data storage.

Figure 18:
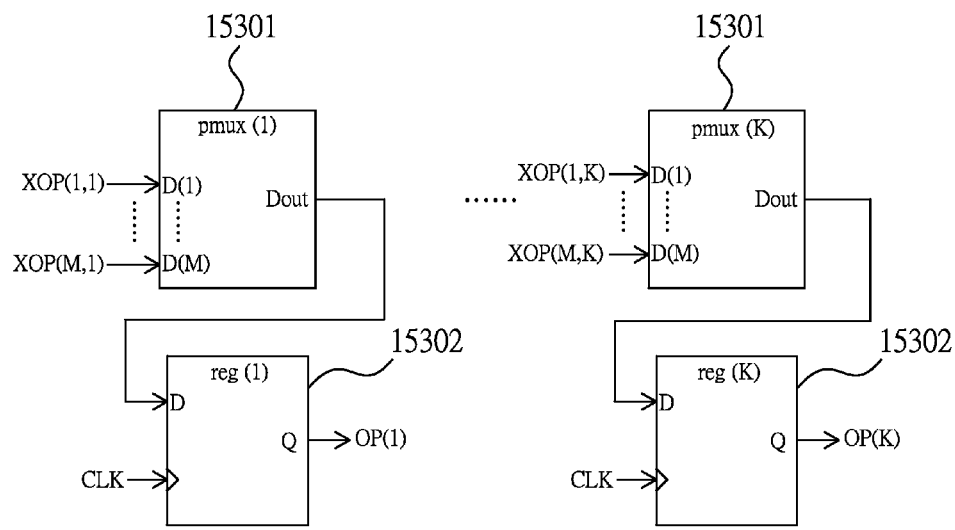
FIG. 18 illustrates a block diagram of an embodiment of an output circuit of FIG. 15.

FIG. 18 illustrates a block diagram of an embodiment of the output circuit 1530, which includes K third priority multiplexers 15301 and K registers 15302. Each of the third priority multiplexers 15301 has M third input ends and a third output end, wherein an Rth one of the third input ends of a Qth one of the third priority multiplexers 15301 is coupled with a Qth one of the matching output ends of an Rth one of the rule units, R=1 to M, and the third output end of an Qth one of the third priority multiplexers 15301 provides Qth matching output data, Q=1 to K, and Q, R are positive integers. Besides, the K registers 15302 are used for temporary data storage.

As a result, this adaptive structure is suitable for a single integrated circuit implementation due to a fact that when the keyword is changed, what have to be done is a renewal of rules and an update of rule data in the rule units.

Example of Configurable Rule Units Having 7 Stage Units

Figure 19:
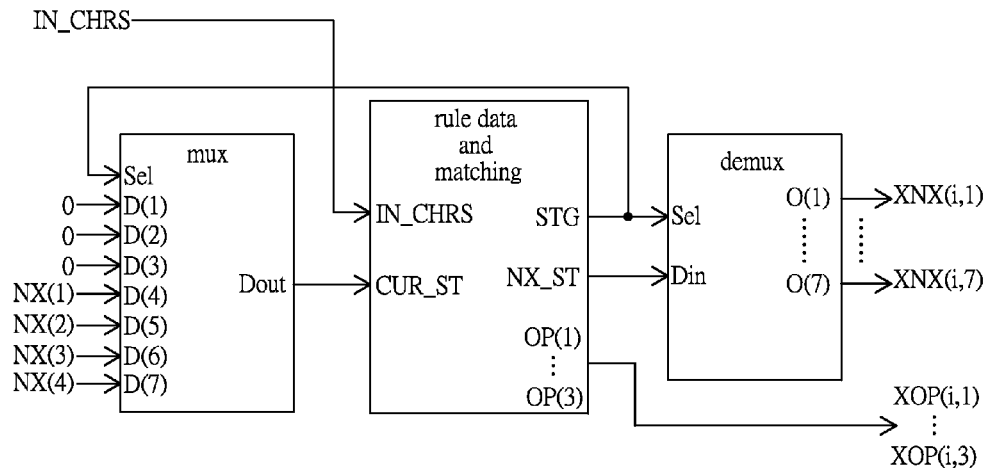
FIG. 19 illustrates a block diagram of an embodiment of a general rule unit for processing three characters with 7 stages.

To further illustrate this structure for readers, a rule unit of K=3 and L=7 is implemented in FIG. 19. As illustrated in FIG. 19, a general rule unit corresponds to 7 stages, a multiplexer (mux) has 7 input ends, and a demultiplexer (demux) has 7 output ends. The rules of the foregoing rule table are used for illustration. For example, rule 1 is for stage 7, so the mux will select NX(4), which is coupled with D(7), as current state. The demux will then select O(7) to output NX_ST, which is determined by the rule unit, and next state is determined by a subcircuit, which is corresponding to stage 7, of a state circuit in a way that has been elaborated in the foregoing specification.

Figure 20:
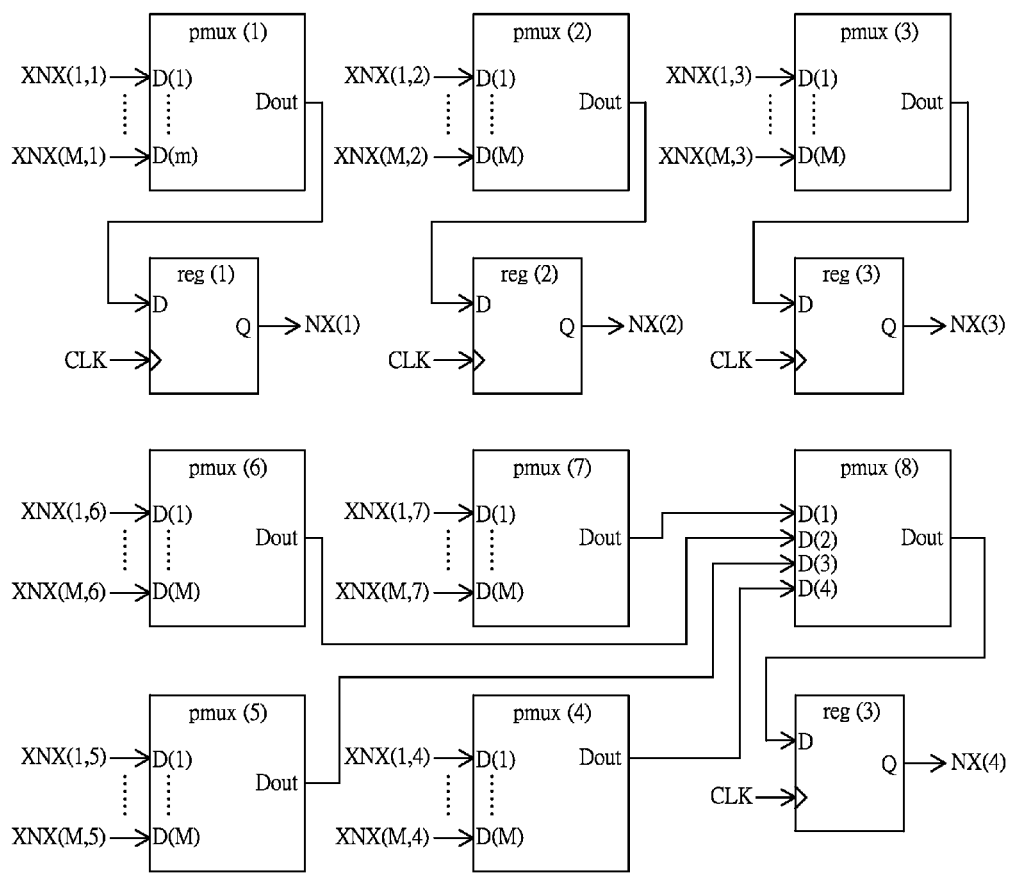
FIG. 20 illustrates a block diagram of an embodiment of a state circuit for processing three characters with 7 stages.

FIG. 20 is an illustrative diagram of an embodiment of the state circuit. Of the circuit, the first three priority multiplexers pmux(1)-pmux(3) determine next states according to state outputs from stage 1-3, and registers reg(1)-reg(3) are used for temporary data storage. The outputs NX(1)-NX(3) of reg(1)-reg(3) are for stage 1-3. Besides, pmux(4)-pmux(7) determines next states according to state outputs from stage 4-7, and sends them to pmux(8) to determine next state NX(4) for stage 7.

Figure 21:
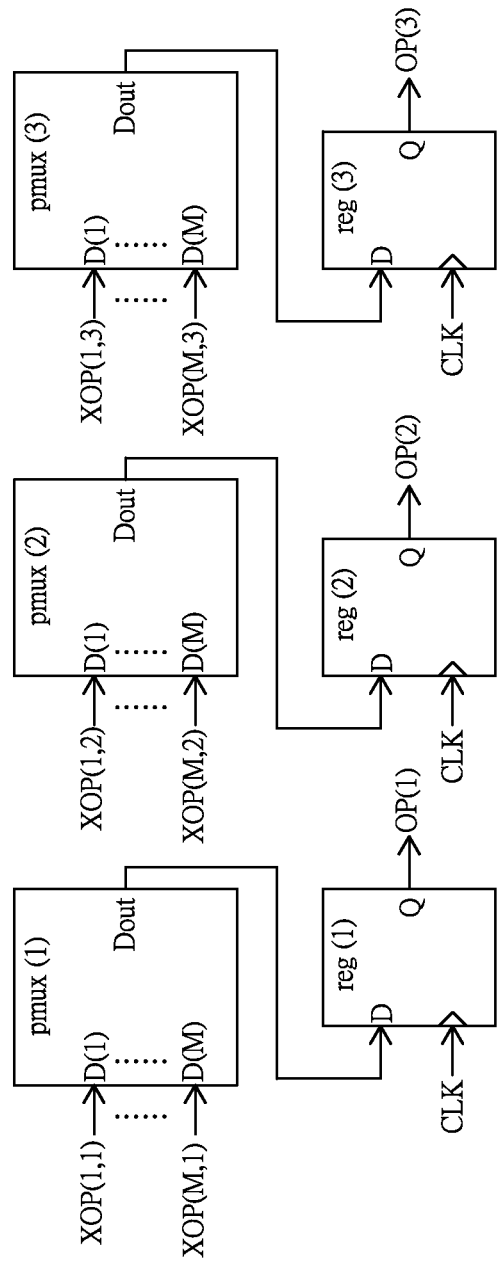
FIG. 21 illustrates a block diagram of an embodiment of an output circuit for processing three characters with 7 stages.

FIG. 21 is an illustrative diagram of an embodiment of an output circuit, which includes three identical circuits for determining matching outputs corresponding to three input characters. Each of the three identical circuits includes a priority multiplexer and a register, the priority multiplexer having M input ends, each corresponding to a rule unit, and the register being used to store the matching result of that matching cycle.

In addition, a person having ordinary skill in the art can implement a string matching device capable of processing several input strings of different number of characters with different keywords at a time with reference to the disclosure of the present invention.

With the specification elaborated above, the present invention has been disclosed in detail, and the design of the multi-stage parallel multi-character string matching is proven to be able to process multiple characters in a matching cycle to fully exploit the performance of the hardware circuit.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A multi-stage parallel multi-character string matching device, comprising:
   a rule circuit having M general rule units, of which each has a string input end, N current state input ends, L next state output ends, and K matching output ends, wherein, M, N, L, K are positive integers, L is larger than K, and N=L−K; and of which each has transition rule based on an AC-trie;
   a state circuit, which has L first priority multiplexers and a second priority multiplexer, each of said first priority multiplexers having M first input ends and a first output end, said second priority multiplexer having K+1 second input ends and a second output end, wherein an Ith one of said first priority multiplexers has a Jth one of said first input ends coupled to an Ith one of said next state output ends of a Jth one of said general rule units, J=1 to M, I=1 to L, I, J being positive integers, wherein, said first output ends of first to (L−K−1)th ones of said first priority multiplexers are coupled to first to (L−K−1)th ones of said current state input ends of said rule circuit respectively; a Pth one of said second input ends of said second priority multiplexer is coupled to said first output end of an (L−P+1)th one of said first priority multiplexers, P=1 to K+1, P being a positive integer, and said second output end of said second priority multiplexer is coupled to an (L−K)th one of said current state input ends of said rule circuit; and an output circuit, which has K third priority multiplexers each having M third input ends and a third output end, wherein Rth one of said third input ends of Qth one of said third priority multiplexers is coupled with Qth one of said matching output ends of Rth one of said rule units, R=1 to M, and said third output end of Qth one of said third priority multiplexers being used to provide a Qth matching output data, Q=1 to K, and Q, R being positive integers.

2. The multi-stage parallel multi-character string matching device as claim 1, wherein said general rule unit comprises:

a multiplexer, which has a first selection input end, L data input ends, and a data output end, wherein, first to Kth ones of said data input ends are coupled with a low voltage, and (K+1)th to Lth ones of said data input ends are coupled with first to (L−K)th ones of said current state input ends;

a rule unit embodying one of said transition rules, said rule matching unit including: a fourth input end coupled with said string input end; a fifth input end coupled with said data output end of said multiplexer; a stage data output end coupled with said first selection input end of said multiplexer; a next state data output end; and K fourth output ends coupled with said K matching output ends respectively; and a de-multiplexer having: a second selection input end coupled with said stage data output end of said rule unit; a sixth input end coupled with said next state data output end of said rule unit; and L fifth output ends coupled with said L next state output ends respectively.

3. The multi-stage parallel multi-character string matching device as claim 1, wherein said state circuit further comprises multiple registers for storing output data of said first priority multiplexers.

4. The multi-stage parallel multi-character string matching device as claim 1, wherein said state circuit further comprises a register for storing output data of said second priority multiplexer.

5. The multi-stage parallel multi-character string matching device as claim 1, wherein said output circuit further comprises multiple registers for storing output data of said third priority multiplexers.

6. A multi-stage parallel multi-character string matching device, comprising:

a first priority multiplexer having K+1 next state data input ends and a next state data output end, K being a positive integer;

L stage units, L being a positive integers, each of said stage units having a current state input end, a string input end, a next state output end, and K stage matching output ends, said string input end being used for receiving a string of K input characters, and each of said stage units having multiple transition rules based on an AC-trie, wherein, first to (L−1)th ones of said stage units are divided into K series combinations, said current state input end of a first one of said stage units of each of said series combinations is coupled with a low voltage, each of said current state input end of second to last ones of said stage units of each of said series combinations is coupled with said next state output end of a preceding one of said stage units, and said next state output end of a last one of said stage units of Ith one of said series combinations is coupled to (K−I+2)th one of said next state data input ends of said first priority multiplexer, I being a positive integer, and I=1 to K; said current state input end of Lth one of said stage units is coupled with said next state data output end of said first priority multiplexer, and said next state output end of Lth one of said stage units is coupled to a first one of said next state data input ends of said first priority multiplexer; and K second priority multiplexers corresponding to K input characters, each of said second priority multiplexers having L stage matching input ends and a matching data output end, wherein first to Lth ones of said stage matching input ends of Jth one of said second priority multiplexers are coupled with Jth one of said stage matching output ends of Lth to first ones of said stage units respectively, and said matching data output end of said Jth one of said second priority multiplexers is used to provide Jth output data, wherein J is a positive integer and J=1 to K.

7. The multi-stage parallel multi-character string matching device as claim 6, wherein each of said stage units comprises:

M rule units each embodying one of said transition rules and each having a first input end, a second input end, a first output end, and K second output ends, wherein said first input end is coupled with said current state input end, said second input end is coupled with said string input end, said first output end is used for providing a next state candidate data, and said second output end is used for outputting a matching candidate data;

a third priority multiplexer having M third input ends and a third output end, wherein first to Mth ones of said third input ends are coupled with said first output ends of first to Mth ones of said rule units respectively;

a state register having a latch input end and a latch output end, wherein said latch input end is coupled with said third output end, and said latch output end is coupled with said next state output end; and K fourth priority multiplexers each having M fourth input ends and a fourth output end, wherein first to Mth ones of said fourth input ends of Pth one of said fourth priority multiplexers are coupled with Pth one of said second output ends of first to Mth ones of said rule units respectively, and said fourth output end is coupled with Pth one of said stage matching output ends, wherein P is a positive integer and P=1 to K.

* * * * *